(12) United States Patent
Luo et al.

(10) Patent No.: US 9,877,165 B2
(45) Date of Patent: *Jan. 23, 2018

(54) INDOOR POSITIONING METHOD AND APPARATUS

(71) Applicant: Huawei Technologies Co., Ltd., Shenzhen (CN)

(72) Inventors: Xinlong Luo, Beijing (CN); Yaohui Wang, Beijing (CN); Qiming Sun, Beijing (CN); Kuanxin Guo, Shenzhen (CN); Xi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,989

(22) Filed: Sep. 7, 2016

(65) Prior Publication Data

US 2016/0381513 A1   Dec. 29, 2016

Related U.S. Application Data

(63) Continuation of application No. 14/983,116, filed on Dec. 29, 2015, now Pat. No. 9,462,424, which is a (Continued)

(51) Int. Cl.
*H04W 4/04* (2009.01)
*G01S 5/02* (2010.01)
*H04W 16/20* (2009.01)

(52) U.S. Cl.
CPC .......... *H04W 4/043* (2013.01); *G01S 5/0252* (2013.01); *H04W 16/20* (2013.01)

(58) Field of Classification Search
CPC .................................................. H04W 4/043
(Continued)

(56) References Cited

U.S. PATENT DOCUMENTS

2005/0195107 A1   9/2005   Wakamatsu
2007/0049286 A1   3/2007   Kim et al.
(Continued)

FOREIGN PATENT DOCUMENTS

CN   102927980 A   2/2013
CN   103841642 A   6/2014

*Primary Examiner* — Michael T Vu
(74) *Attorney, Agent, or Firm* — Leydig, Voit & Mayer, Ltd.

(57) ABSTRACT

Embodiments of the invention disclose an indoor positioning method and apparatus. The method includes: acquiring current cell signal strength information of a terminal located indoors; determining, according to three-dimensional (3D) indoor positioning matching information, horizontal position information and height information of an indoor grid that are corresponding to the current cell signal strength information, where the 3D indoor positioning matching information includes a correspondence between cell signal strength information of the indoor grid and the horizontal position information and the height information of the indoor grid; and determining, according to the horizontal position information and the height information of the indoor grid, a horizontal position at which the terminal is located indoors and a height at which the terminal is located. In this way, high-accuracy 3D indoor positioning can be implemented.

15 Claims, 14 Drawing Sheets

Related U.S. Application Data continuation of application No. PCT/CN2014/081284, filed on Jun. 30, 2014.

(58) Field of Classification Search
USPC .......................................... 455/456.1–456.5
See application file for complete search history.

(56) References Cited

U.S. PATENT DOCUMENTS

| | | | |
|---|---|---|---|
| 2011/0200023 A1* | 8/2011 | Murray | G01S 5/02 370/338 |
| 2013/0310081 A1 | 11/2013 | Chu | |
| 2014/0141803 A1 | 5/2014 | Marti et al. | |
| 2014/0153773 A1* | 6/2014 | Gupta | G06K 9/6202 382/103 |
| 2014/0274151 A1 | 9/2014 | Pattabiraman et al. | |

* cited by examiner

INDOOR POSITIONING METHOD AND APPARATUS

CROSS-REFERENCE TO RELATED APPLICATIONS

This application is a continuation of U.S. patent application Ser. No. 14/983,116, filed on Dec. 29, 2015, which is a continuation of International Patent Application No. PCT/CN2014/081284, filed on Jun. 30, 2014. The afore-mentioned patent applications are hereby incorporated by reference in their entireties.

TECHNICAL FIELD

Embodiments of the present invention relate to the field of communications technologies, and more specifically, to an indoor positioning method and apparatus.

BACKGROUND

With the rapid development of communications technologies and their applications, a communication-based positioning technology has attracted increasing attentions. User position information is a basis for many innovative value-added services and applications, for example, a positioning technology may be applied to refined optimization and problem analysis of a wireless network, or applied to fields such as security protection, targeted advertisement push, and navigation. Generally, a current positioning technology is two-dimensional (2D) positioning in the horizontal dimension of the outdoor ground. Commonly used methods are a feature matching method based on a wireless signal feature, a hyperbolic method based on latency, and the like. By using conventional 2D positioning based on a wireless communication signal, an indoor user cannot be accurately distinguished from an outdoor user, and an indoor user cannot be positioned in a dimension of height either. However, statistics in the industry show that more than 70% of voice services and more than 80% of data services occur indoors, and therefore, indoor positioning for a user has great significance.

A commonly used positioning technology, such as positioning by using Global Positioning System (GPS), is to position a terminal by using a navigation satellite; however, due to blocking and attenuation caused by an indoor environment to a GPS signal, indoor positioning cannot be performed. Some commonly used indoor positioning methods, such as 3D Wi-Fi indoor positioning, are to position a user by using multiple Wi-Fi access points deployed indoors. A major deficiency of Wi-Fi indoor positioning lies in its poor scene adaptability, that is, corresponding positioning can be performed only in a building or a floor in which Wi-Fi is deployed. However, in reality, no Wi-Fi is deployed in most buildings or some floors of a building, and therefore, 3D indoor positioning cannot be performed in these scenes.

Therefore, currently, it is impossible to implement high-accuracy 3D indoor positioning with strong scene adaptability to accurately determine a horizontal position at which a to-be-positioned terminal is located indoors and a height at which the terminal is located, which limits application for an innovative value-added service based on user position information.

SUMMARY

Embodiments of the present invention provide an indoor positioning method and apparatus, which can determine a horizontal position at which a to-be-positioned terminal is located indoors and a height at which the terminal is located, thereby implementing high-accuracy 3D indoor positioning.

According to a first aspect, an indoor positioning method is provided, where the method includes:

acquiring current cell signal strength information of a terminal located indoors;

determining, according to three-dimensional (3D) indoor positioning matching information, horizontal position information and height information of an indoor grid that are corresponding to the current cell signal strength information, where the 3D indoor positioning matching information includes a correspondence between cell signal strength information of the indoor grid and the horizontal position information and the height information of the indoor grid; and determining, according to the horizontal position information and the height information of the indoor grid that are corresponding to the current cell signal strength information, a horizontal position at which the terminal is located indoors and a height at which the terminal is located, where the horizontal position information includes position information in a first direction and a second direction, and the first direction and the second direction are two mutually perpendicular directions in a horizontal plane.

According to a second aspect, an indoor positioning apparatus is provided, where the apparatus includes:

an acquiring module, configured to acquire current cell signal strength information of a terminal located indoors;

a first determining module, configured to determine, according to three-dimensional (3D) indoor positioning matching information, horizontal position information and height information of an indoor grid that are corresponding to the current cell signal strength information acquired by the acquiring module, where the 3D indoor positioning matching information includes a correspondence between cell signal strength information of the indoor grid and the horizontal position information and the height information of the indoor grid; and a second determining module, configured to determine, according to the horizontal position information and the height information of the indoor grid that are corresponding to the current cell signal strength information and determined by the first determining module, a horizontal position at which the terminal is located indoors and a height at which the terminal is located, where the horizontal position information includes position information in a first direction and a second direction, and the first direction and the second direction are two mutually perpendicular directions in a horizontal plane.

Based on the foregoing technical solutions, according to the indoor positioning method and apparatus provided in the embodiments of the present invention, current cell signal strength information of a to-be-positioned terminal located indoors is matched with cell signal strength information in three-dimensional (3D) indoor positioning matching information to determine a corresponding indoor grid and horizontal position information and height information of the indoor grid, so as to determine a horizontal position at which the terminal is located indoors and a height at which the terminal is located. In this way, high-accuracy (3D) indoor positioning can be implemented.

BRIEF DESCRIPTION OF DRAWINGS

To describe the technical solutions in the embodiments of the present invention more clearly, the following briefly introduces the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that in the embodiments of the present invention, a terminal may also be referred to as a system, a subscriber unit, a subscriber station, a mobile station, a mobile platform, a remote station, a remote terminal, a mobile device, a user terminal, a terminal, a wireless communication device, a user agent, a user apparatus, or a user equipment (UE). The terminal may be a cellular phone, a cordless phone, a SIP (Session Initiation Protocol) phone, a WLL (wireless local loop) station, a PDA (personal digital assistant), a handheld device having a wireless communication function, a vehicle-mounted device, a computing device, or another processing device connected to a wireless modem.

It should further be understood that in the embodiments of the present invention, a base station can be used to communicate with a mobile device; and the base station may be a BTS (Base Transceiver Station) in GSM (Global System of Mobile communication) or CDMA (Code Division Multiple Access); may be an NB (NodeB) in WCDMA (Wideband Code Division Multiple Access); or may be an eNB or eNodeB (Evolutional Node B, evolved NodeB) in LTE (Long Term Evolution), a relay station or an access point, or a base station device in a future 5G network, or the like.

In the embodiments of the present invention, a specific embodiment in which current cell signal strength information of a terminal is matched with cell signal strength information in 3D indoor positioning matching information, so as to implement positioning for the terminal is described first.

Figure 1:
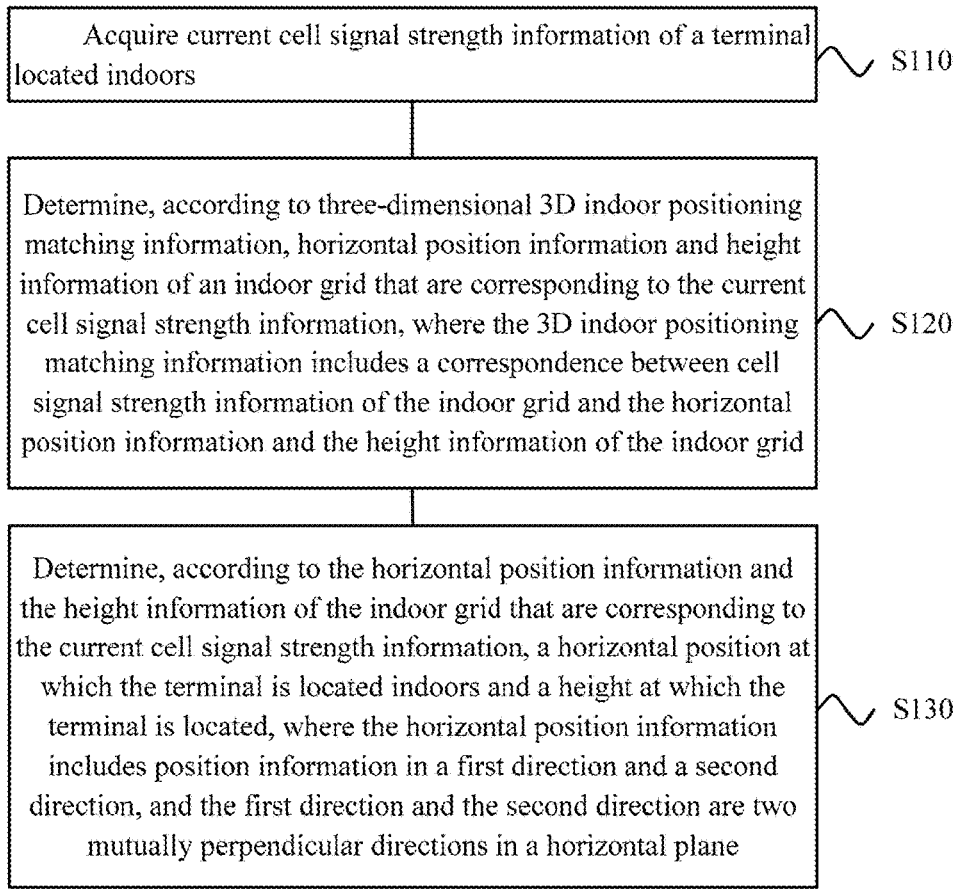
FIG. 1 is a schematic flowchart of an indoor positioning method according to an embodiment of the present invention.

FIG. 1 shows an indoor positioning method 100 according to an embodiment of the present invention, where the method 100 may be executed by an indoor positioning apparatus. As shown in FIG. 1, the method 100 includes:

S110. Acquire current cell signal strength information of a terminal located indoors.

S120. Determine, according to three-dimensional (3D) indoor positioning matching information, horizontal position information and height information of an indoor grid that are corresponding to the current cell signal strength information, where the 3D indoor positioning matching information includes a correspondence between cell signal strength information of the indoor grid and the horizontal position information and the height information of the indoor grid.

S130. Determine, according to the horizontal position information and the height information of the indoor grid that are corresponding to the current cell signal strength information, a horizontal position at which the terminal is located indoors and a height at which the terminal is located, where the horizontal position information includes position information in a first direction and a second direction, and the first direction and the second direction are two mutually perpendicular directions in a horizontal plane.

In S110, the current cell signal strength information of the terminal may be acquired by using a measurement report (MR) reported by the terminal, or may be acquired by other means, which is not limited in this embodiment of the present invention. Specifically, a cell that can receive a signal of the terminal currently, signal strength corresponding to the cell, and the like in an MR of a to-be-positioned terminal may be extracted as current cell signal strength information corresponding to the terminal, where the current cell signal strength information is used to be matched with cell signal strength information in positioning matching information stored in an indoor positioning apparatus. Certainly, in addition to the current cell signal strength information of the terminal, reference may be further made to other information of the terminal. For example, when the to-be-positioned terminal has an atmospheric pressure measurement function, the positioning apparatus may further refer to atmospheric pressure information, so as to help determine a height at which the to-be-positioned terminal is located, which is not limited in this embodiment of the present invention.

In S120, the current cell signal strength information of the terminal is matched with the cell signal strength information in the 3D indoor positioning matching information to determine a corresponding indoor grid and horizontal position information and height information of the indoor grid. It may be approximately considered that the terminal is located at the center of the indoor grid. Specifically, the 3D indoor positioning matching information may include a correspondence between the cell signal strength information and the horizontal position information and the height information of the indoor grid, and may further include some other information used for matching, such as information about atmospheric pressure at the indoor grid, so as to perform matching with the atmospheric pressure information in the MR of the terminal to improve accuracy of positioning matching, which is not limited in this embodiment of the present invention.

It should be noted that a method for determining cell signal strength information in 3D indoor positioning matching information is described in detail in the following methods 200 to 600. The cell signal strength information in the 3D indoor positioning matching information and the current cell signal strength information of the terminal may be one cell and signal strength corresponding to the cell, or may be multiple cells and signal strength corresponding to the multiple cells, which is not limited in this embodiment of the present invention.

Figure 2:
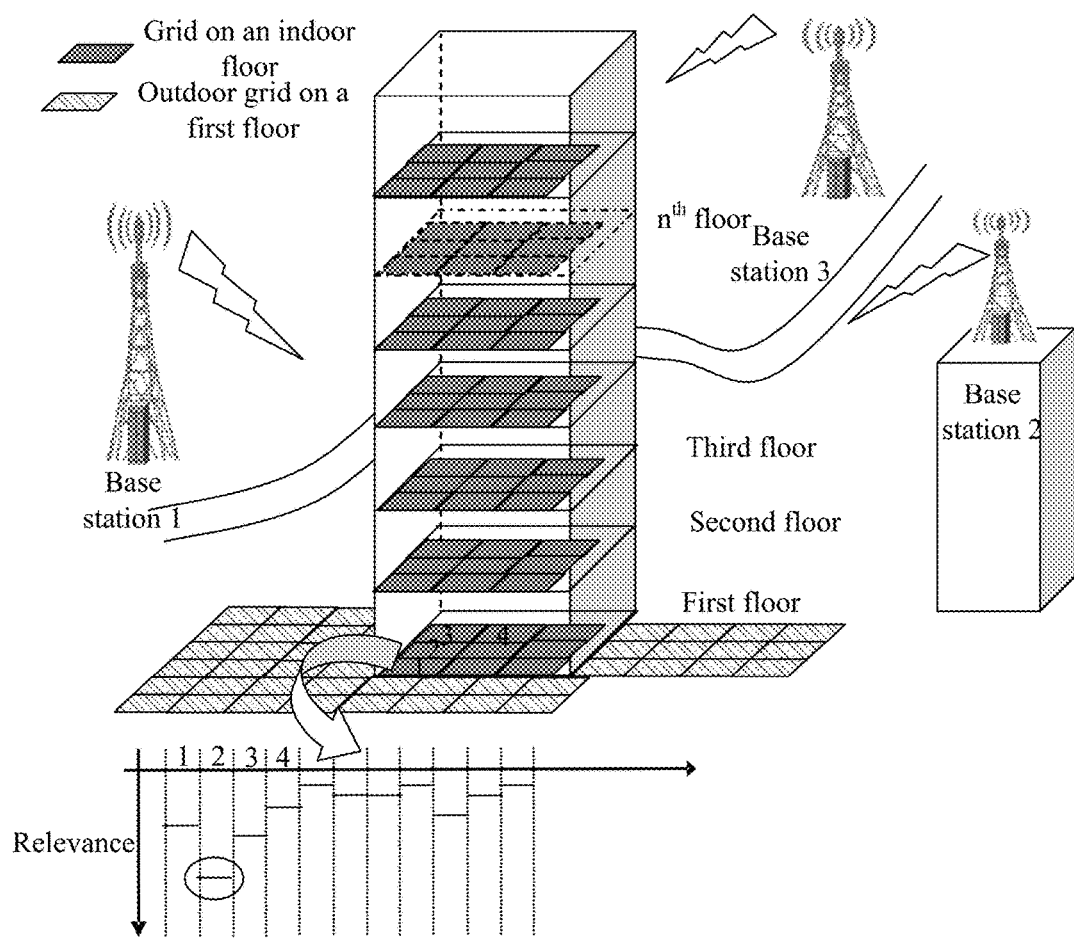
FIG. 2 is a schematic diagram of an indoor positioning method according to an embodiment of the present invention.

When matching of cell signal strength information is performed, it is possible that a grid completely matched with the current cell signal strength information of the terminal cannot be found in the 3D indoor positioning matching information, but multiple grids close to the current cell signal strength information of the terminal are found instead. In this case, as shown in FIG. 2, multiple grids in which the terminal is possibly located may be numbered with 1, 2, 3, 4 . . . ; relevance between a cell in the current cell signal strength information of the terminal and a cell corresponding to each grid is calculated; and a grid with the greatest relevance (for example, a grid 2) is determined as a position of a user. It should be understood that the 3D indoor positioning matching information may be a part of a positioning matching database, and the database may further include some 2D/3D indoor and outdoor test data, which is not limited in this embodiment of the present invention.

In S130, the horizontal position at which the terminal is located and the height at which the terminal is located may be determined according to the horizontal position information and the height information of the indoor grid that are corresponding to the current cell signal strength information of the terminal. Indoor grid division is made according to 3D modeling, and for the purpose of simple division and covering an area as completely as possible in a same horizontal plane, a shape of a grid may be square. For example, an indoor grid may be a square, and a side length of the indoor grid may be generally 5 meters or 10 meters, but this embodiment of the present invention is not limited thereto. A horizontal position of the indoor grid refers to a position in the horizontal direction; horizontal position information may include position information in a first direction and a second direction; and the first direction and the second direction are two mutually perpendicular directions in a horizontal plane, for example, the first direction and the second direction may be generally longitude and latitude, but this embodiment of the present invention does not exclude a possibility of using more directions to represent the horizontal position.

Therefore, according to the indoor positioning method provided in this embodiment of the present invention, current cell signal strength information of a to-be-positioned terminal located indoors is matched with cell signal strength information in three-dimensional (3D) indoor positioning matching information to determine a corresponding indoor grid and horizontal position information and height information of the indoor grid, so as to determine a horizontal position at which the terminal is located indoors and a height at which the terminal is located. In this way, high-accuracy 3D indoor positioning can be implemented.

Optionally, as an embodiment, before S120, the method 100 may further include:

determining, according to the current cell signal strength information of the terminal, 2D positioning matching information, and a 3D GIS (three-dimensional geographic information system), that the terminal is located indoors, where the 2D positioning matching information includes a correspondence between horizontal position information and cell signal strength information.

Figure 3:
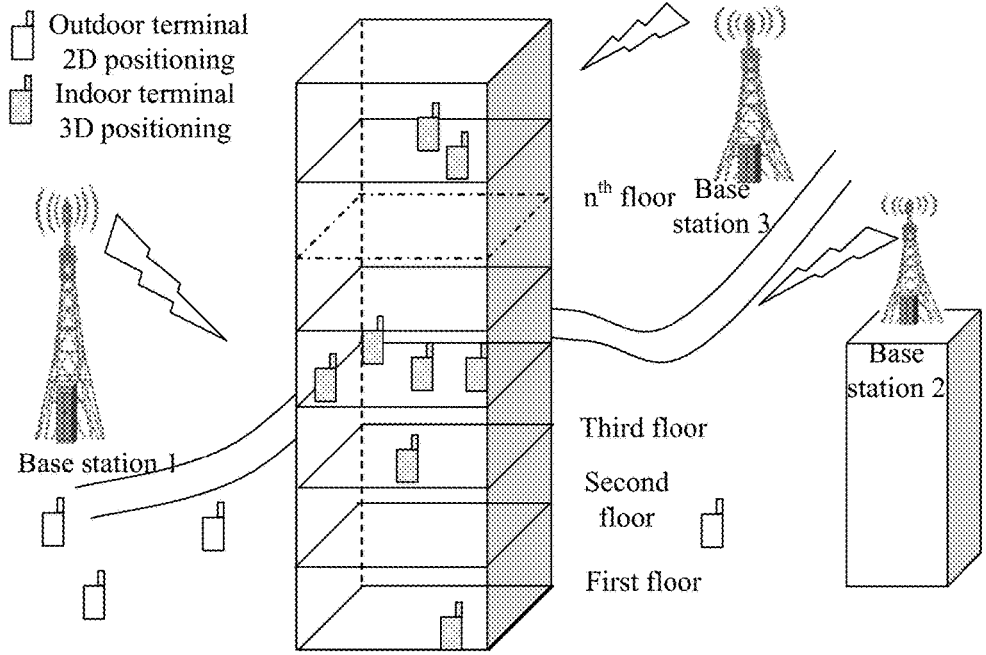
FIG. 3 is a schematic diagram of an effect of a positioning method according to an embodiment of the present invention.

Specifically, 2D positioning may be first performed on the terminal by using a 2D positioning technology, that is, according to information included in the MR reported by the terminal, an approximate position of the terminal in a horizontal plane is determined by using 2D positioning matching information; and with reference to the position, whether the terminal is located in a building is determined by using a 3D GIS. When it is determined that the terminal is located indoors, accurate positioning is performed on the terminal according to 3D indoor positioning matching information corresponding to the building and according to the current cell signal strength information of the terminal. 2D/3D positioning of multiple outdoor or indoor terminals may be implemented by using this method, and a positioning effect is shown in FIG. 3. For example, when the terminal is an outdoor terminal, longitude and latitude at which the terminal is located may be determined; and when the terminal is an indoor terminal, longitude, latitude, and a height at which the terminal is located may be determined.

Therefore, according to the positioning method provided in this embodiment of the present invention, firstly, it is determined, by using a 2D positioning technology, that a terminal is located indoors; then, current cell signal strength information of the terminal is matched with cell signal strength information in 3D indoor positioning matching information to determine an indoor grid at which the terminal is located, so as to determine a horizontal position and a height at which the terminal is located. In this way, high-accuracy 3D indoor positioning can be implemented.

With reference to FIG. 1 to FIG. 3, the indoor positioning method according to this embodiment of the present invention is described in detail in the foregoing. With reference to FIG. 4 to FIG. 15, a method for determining 3D indoor positioning matching information and a method for determining cell signal strength information in the 3D indoor positioning matching information that are required in the foregoing positioning method are described in detail in the following.

An indoor grid and horizontal position information and height information of the indoor grid may be determined separately, and then, cell signal strength information corresponding to each grid is determined, to determine the 3D indoor positioning matching information, where the 3D indoor positioning matching information includes a correspondence between cell signal strength information and the horizontal position information and the height information of the indoor grid.

Determining an indoor grid and horizontal position information and height information of the indoor grid may be implemented by performing grid division on a building. The grid division may be performed for a building according to the following steps:

First, extract information about a building, that is, extract, based on a 3D GIS, vector contour information, height information, and the like of the building, where the 3D GIS is also called a 3D electronic map and is widely applied to emulation of user wireless network planning, and clutter information, such as a building and a river, is included in the map.

Second, perform 3D modeling on the building, that is, perform 3D modeling on the building by using the information about the building extracted from the 3D GIS, that is, mark the building on the map by using the contour information, the height information and the like obtained from the foregoing step.

Third, perform indoor floor classification for the building, that is, perform floor classification for a 3D model of the building.

Fourth, perform indoor grid division for the building, that is, perform grid division for each floor of the building according to 3D GIS resolution or a multiple of resolution.

A core of this embodiment of the present invention is to determine cell signal strength information of an indoor grid by using cell signal strength information of a corresponding outdoor grid. Therefore, in addition to the indoor grid division for the building, grid division may further be performed for a first outdoor floor and outdoor space corresponding to each floor of the building. An interval between buildings of common real estate is approximately 50 to 60 meters, and basically, no obstruction of other buildings exists within this range of distance. Therefore, when outdoor grid division is performed, an outdoor area whose distance from a wall of an exterior of a building is within a range of 50 to 60 meters may be selected, that is, a farthest distance between an outdoor grid on a first floor and a corresponding edge grid in indoor grids on the first floor is 50 to 60 meters. After the indoor grid division is performed, grids may be classified into two types: an edge grid and a non-edge grid. The edge grid refers to an indoor grid that is directly connected to the wall; and the non-edge grid refers to an indoor grid that is not directly connected to the wall.

Because an indoor signal varies more greatly than an outdoor signal within a same range of distance, generally, a relatively small indoor grid may be selected. For the purpose of simple division and covering an area as completely as possible in a same horizontal plane, a shape of a grid may be square. For example, an indoor grid may be a square, and a side length of the indoor grid may be generally 5 meters or 10 meters; and an outdoor grid may also be a square, and a side length of the outdoor grid may be generally 20 meters, 30 meters, 50 meters, or the like. By using the foregoing steps, when grid division is performed for an indoor area and an outdoor area, horizontal position information and height information that are corresponding to a grid are determined. Herein, a horizontal position of the grid may be considered as a horizontal position of the center of the grid, for example, longitude and latitude of the center of the grid.

It should be understood that the foregoing grid division is described by considering each indoor floor of a building and each corresponding outdoor floor as a whole; however, such description constitutes no limitation on this embodiment of the present invention, that is, it may also be that grid division is performed merely for a corresponding floor or a corresponding area according to an actual requirement.

Figure 4:
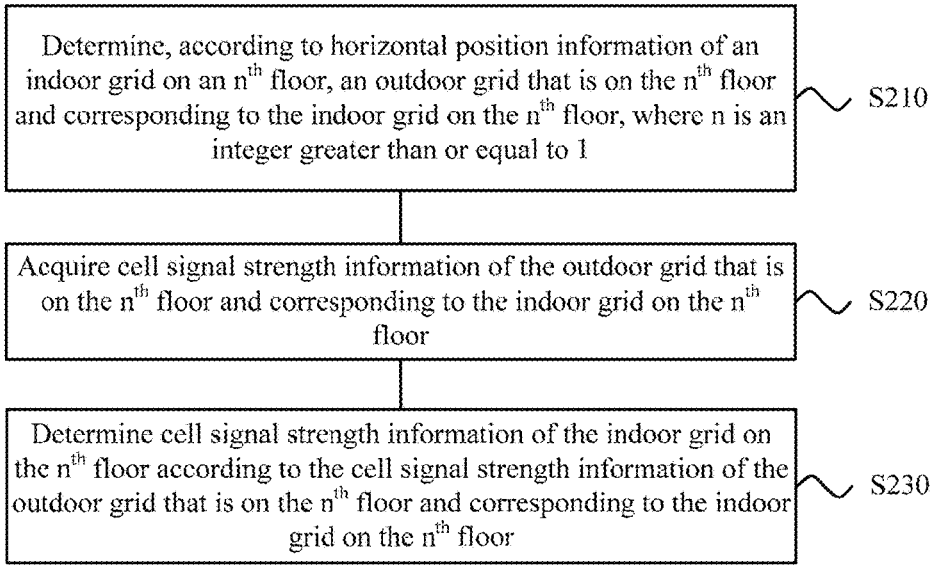
FIG. 4 is a schematic flowchart of a method for determining cell signal strength information of an indoor grid according to an embodiment of the present invention.

FIG. 4 shows a method 200 for determining cell signal strength information of an indoor grid according to an embodiment of the present invention. The method 200 may be executed by an apparatus for determining cell signal strength information of an indoor grid, or may be executed by a corresponding module of an indoor positioning apparatus. As shown in FIG. 4, the method 200 includes:

S210. Determine, according to horizontal position information of an indoor grid on an $n^{th}$ floor, an outdoor grid that is on the $n^{th}$ floor and corresponding to the indoor grid on the $n^{th}$ floor, where n is an integer greater than or equal to 1.

A to-be-determined grid is selected from the indoor grid on the $n^{th}$ floor. According to the horizontal position information of the indoor grid on the $n^{th}$ floor, or the horizontal position information and height information of the indoor grid on the $n^{th}$ floor, with reference to engineering parameter of an antenna of a surrounding base station, one or more outdoor grids that are on the $n^{th}$ floor and corresponding to the indoor grid on the $n^{th}$ floor may be determined. Information to which reference is made when the outdoor grid on the $n^{th}$ floor is determined varies with a grid type. For example, when the indoor grid on the $n^{th}$ floor is an indoor edge grid on the $n^{th}$ floor, a corresponding outdoor grid on the $n^{th}$ floor may be determined with reference to a horizontal position of the indoor edge grid on the $n^{th}$ floor; and when the indoor grid on the $n^{th}$ floor is an indoor non-edge grid on the $n^{th}$ floor, in addition to a horizontal position of the indoor non-edge grid on the $n^{th}$ floor, reference is further made to height information of the indoor non-edge grid on the $n^{th}$ floor, an engineering parameter of an antenna of a surrounding base station, and the like. In addition, the corresponding outdoor grid on the $n^{th}$ floor may be further determined with reference to other information. For example, emulation calculation may be performed for the indoor grid on the $n^{th}$ floor and the corresponding outdoor grid on the $n^{th}$ floor according to an engineering parameter of an antenna or other information; and a cell in cell signal strength information of the indoor grid on the $n^{th}$ floor is determined with reference to a cell in cell signal strength information, which is obtained through calculation, of the corresponding outdoor grid on the $n^{th}$ floor. A specific method is illustrated in the following embodiments.

S220. Acquire cell signal strength information of the outdoor grid that is on the $n^{th}$ floor and corresponding to the indoor grid on the $n^{th}$ floor. There may be many ways to acquire the cell signal strength information of the corresponding outdoor grid on the $n^{th}$ floor. For example, the cell signal strength information may be from test data such as drive test (Drive Test, DT) data and/or terminal data, or may be cell signal strength information obtained through calculation, which is not limited in this embodiment of the present invention.

S230. Determine cell signal strength information of the indoor grid on the $n^{th}$ floor according to the cell signal strength information of the outdoor grid that is on the $n^{th}$ floor and corresponding to the indoor grid on the $n^{th}$ floor. An attenuation rule of signal strength of an outdoor grid that is on the $n^{th}$ floor and whose horizontal distance from a building is less than a specific value (for example, 50 to 60 meters) is relatively similar to an attenuation rule of signal strength of the indoor grid on the $n^{th}$ floor, and similar signal features are often presented, which is in conformity with statistic characteristics in mathematics; therefore, cell signal strength information of an outdoor grid on the $n^{th}$ floor may be used to determine cell signal strength information of a grid on the $n^{th}$ floor of a building.

Therefore, according to the method for determining cell signal strength information of an indoor grid provided in this embodiment of the present invention, an outdoor grid that is on an $n^{th}$ floor and corresponding to an indoor grid on the $n^{th}$ floor is determined according to horizontal position information of the indoor grid on the $n^{th}$ floor; and cell signal strength information of the indoor grid on the $n^{th}$ floor may be determined according to the acquired cell signal strength information of the corresponding outdoor grid on the $n^{th}$ floor, so that high-accuracy indoor cell signal strength information can be obtained, so as to further implement high-accuracy 3D indoor positioning.

Optionally, as an embodiment, when a to-be-determined indoor grid on the $n^{th}$ floor is an indoor edge grid on the $n^{th}$ floor, the determining, according to horizontal position information of an indoor grid on an $n^{th}$ floor, an outdoor grid that is on the $n^{th}$ floor and corresponding to the indoor grid on the $n^{th}$ floor may include:

determining, according to horizontal position information of the indoor edge grid on the $n^{th}$ floor, an outdoor grid that is on the $n^{th}$ floor and whose distance from the indoor edge grid on the $n^{th}$ floor is less than a first threshold, where the distance is obtained through calculation according to horizontal position information of the grids; and the determining cell signal strength information of the indoor grid on the $n^{th}$ floor according to the cell signal strength information of the outdoor grid that is on the $n^{th}$ floor and corresponding to the indoor grid on the $n^{th}$ floor includes:

determining cell signal strength information of the indoor edge grid on the $n^{th}$ floor according to cell signal strength information of the outdoor grid that is on the $n^{th}$ floor and whose distance from the indoor edge grid on the $n^{th}$ floor is less than the first threshold and according to a loss relationship between indoor signal strength and outdoor signal strength.

Specifically, for any indoor edge grid on the $n^{th}$ floor, at least one outdoor grid that is on the $n^{th}$ floor and whose distance from the edge grid is within a range of the first threshold may be obtained through calculation according to the horizontal position information of the indoor edge grid on the $n^{th}$ floor. A value such as 20 meters or 30 meters corresponding to a size of an outdoor grid may be selected for the range of the first threshold. Preferably, an outdoor grid that is on the $n^{th}$ floor and closest to the indoor edge grid on the $n^{th}$ floor may be selected.

The cell signal strength information of the indoor edge grid on the $n^{th}$ floor may be determined by considering the loss relationship between indoor signal strength and outdoor signal strength and according to the cell signal strength information of the outdoor grid that is on the $n^{th}$ floor and corresponding to the indoor edge grid on the $n^{th}$ floor. The loss relationship between indoor signal strength and outdoor signal strength may be an empirical formula, for example, an empirical formula related to factors such as thickness and a height of a wall, and a frequency band of a signal; or may be an empirical value, for example, a wall penetration loss (Wall-PLoss) value. Selection of the Wall-PLoss value may also be related to a factor such as a frequency band, and a range of the Wall-PLoss value may be 3 to 10 dB. More preferably, the Wall-PLoss value may be 5 dB.

As a specific example, a cell in the cell signal strength information of the outdoor grid on the $n^{th}$ floor may be determined as a cell in the cell signal strength information of the indoor edge grid on the $n^{th}$ floor; and a result that is obtained after the Wall-PLoss value is subtracted from signal strength of a cell of the outdoor grid on the $n^{th}$ floor is used as signal strength of the cell of the indoor edge grid on the $n^{th}$ floor.

Preferably, emulated cell signal strength information of the indoor edge grid on the $n^{th}$ floor may be determined through emulation calculation, such as a ray tracing method, and according to engineering parameter information of an antenna. The emulated cell signal strength information includes information such as one or more cells that can be received by a grid, and signal strength corresponding to each cell. On the basis of the emulated cell signal strength information, the cell signal strength information of the indoor edge grid on the $n^{th}$ floor may be determined by using the cell signal strength information of the corresponding outdoor grid on the $n^{th}$ floor. The engineering parameter information of the antenna includes an antenna-related engineering parameter in wireless network planning, for example, antenna azimuth, downtilt, antenna height, antenna longitude and latitude information, and transmit power.

After a cell in the emulated cell signal strength information of the indoor edge grid on the $n^{th}$ floor is compared with a cell in the cell signal strength information of the corresponding outdoor grid on the $n^{th}$ floor, a same cell is used as a cell of the indoor edge grid on the $n^{th}$ floor; and for a cell that exists only in the emulated cell signal strength information of the indoor edge grid on the $n^{th}$ floor or a cell that exists only in the cell signal strength information of the corresponding outdoor grid on the $n^{th}$ floor, it is required to determine, with reference to the engineering parameter of the antenna, whether a signal of the cell should exist at the indoor edge grid on the $n^{th}$ floor, and if a signal of the cell should exist at the indoor edge grid on the $n^{th}$ floor, the cell is also used as a cell of the indoor edge grid on the $n^{th}$ floor. In addition, reference may be further made to a propagation situation of a base station that is of another cell and close to the base station of the cell, to help determine whether a cell should exist at a first edge grid. There are many methods for determining a cell, which is not limited in this embodiment of the present invention.

For a cell that exists in both the emulated cell signal strength information of the indoor edge grid on the $n^{th}$ floor and the cell signal strength information of the corresponding outdoor grid on the $n^{th}$ floor, signal strength of the indoor edge grid on the $n^{th}$ floor may still be determined by subtracting the Wall-PLoss value from signal strength of the corresponding outdoor grid on the $n^{th}$ floor. For a cell that exists in the emulated cell signal strength information of the indoor edge grid on the $n^{th}$ floor but does not exist in the cell signal strength information of the corresponding outdoor grid on the $n^{th}$ floor, signal strength corresponding to the cell in the emulated cell signal strength information of the indoor edge grid on the $n^{th}$ floor may be selected as signal strength of the indoor edge grid on the $n^{th}$ floor.

Optionally, as another embodiment, when the to-be-determined indoor grid on the $n^{th}$ floor is an indoor non-edge grid on the $n^{th}$ floor, the determining, according to horizontal position information of an indoor grid on an $n^{th}$ floor, an outdoor grid that is on the $n^{th}$ floor and corresponding to the indoor grid on the $n^{th}$ floor may include:

determining an indoor edge grid that is on the $n^{th}$ floor in any direction of the horizontal position information and corresponding to the indoor non-edge grid on the $n^{th}$ floor; and determining a first outdoor grid and a second outdoor grid, where both the first outdoor grid and the second outdoor grid are outdoor grids on the $n^{th}$ floor, a relative position relationship between the first outdoor grid and the second outdoor grid is consistent with a relative position relationship between the indoor non-edge grid on the $n^{th}$ floor and the indoor edge grid that is on the $n^{th}$ floor and corresponding to the indoor non-edge grid on the $n^{th}$ floor, environmental relevance of the first outdoor grid is consistent with environmental relevance of the indoor edge grid that is on the $n^{th}$ floor and corresponding to the indoor non-edge grid on the $n^{th}$ floor, the relative position relationship between the first outdoor grid and the second outdoor grid is obtained through calculation according to horizontal position information of the first outdoor grid and horizontal position information of the second outdoor grid, and the relative position relationship between the indoor non-edge grid on the $n^{th}$ floor and the indoor edge grid that is on the $n^{th}$ floor and corresponding to the indoor non-edge grid on the $n^{th}$ floor is obtained through calculation according to horizontal position information of the indoor non-edge grid on the $n^{th}$ floor and horizontal position information of the indoor edge grid that is on the $n^{th}$ floor and corresponding to the indoor non-edge grid on the $n^{th}$ floor; and the determining cell signal strength information of the indoor grid on the $n^{th}$ floor according to the cell signal strength information of the outdoor grid that is on the $n^{th}$ floor and corresponding to the indoor grid on the $n^{th}$ floor may include:

determining cell signal strength information of the indoor non-edge grid on the $n^{th}$ floor according to cell signal strength information of the first outdoor grid, cell signal strength information of the second outdoor grid, and cell signal strength information of the indoor edge grid that is on the $n^{th}$ floor and corresponding to the indoor non-edge grid on the $n^{th}$ floor.

Figure 5:
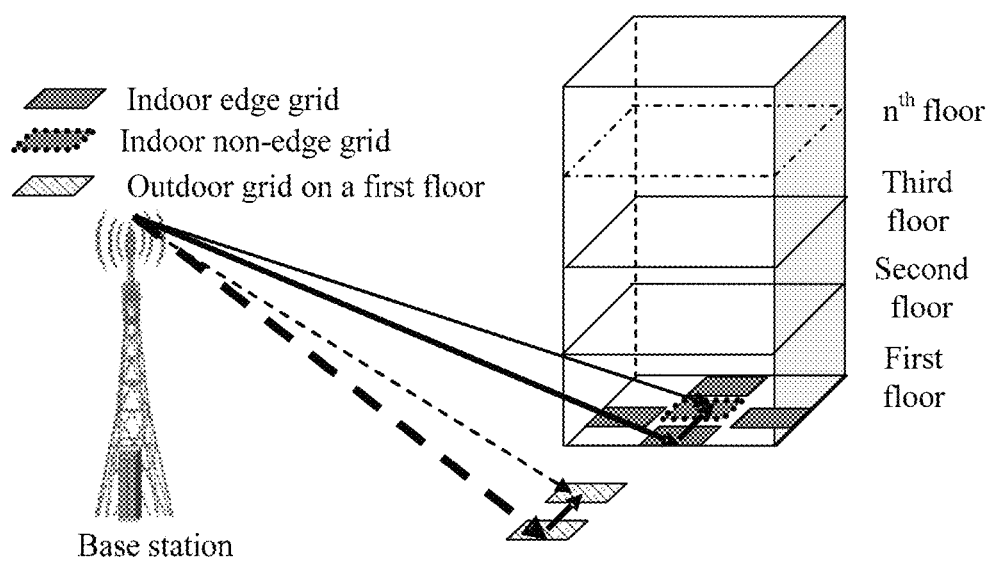
FIG. 5 is a schematic diagram of a method for determining cell signal strength information of an indoor grid according to an embodiment of the present invention.

Specifically, for any indoor non-edge grid on the $n^{th}$ floor, there may be multiple indoor edge grids that are on the $n^{th}$ floor and have a position that is the same as or close to that of the indoor non-edge grid on the $n^{th}$ floor in the first direction, or the second direction, or other directions of a horizontal position. Referring to FIG. 5 in which an indoor edge grid on a first floor is used as an example, four indoor edge grids are shown in the figure. An indoor edge grid that is on the $n^{th}$ floor and corresponding to the indoor non-edge grid on the $n^{th}$ floor is selected for illustration. A vector from the center of the indoor edge grid that is on the $n^{th}$ floor and corresponding to the indoor non-edge grid on the $n^{th}$ floor to the center of the indoor non-edge grid on the $n^{th}$ floor may be determined, where a size of the vector is a distance between the center of the indoor edge grid that is on the $n^{th}$ floor and corresponding to the indoor non-edge grid on the $n^{th}$ floor and the center of the indoor non-edge grid on the $n^{th}$ floor, and a direction of the vector is from the center of the indoor edge grid that is on the $n^{th}$ floor and corresponding to the indoor non-edge grid on the $n^{th}$ floor to the center of the indoor non-edge grid on the $n^{th}$ floor.

A first outdoor grid whose environmental relevance is consistent with environmental relevance of the indoor edge grid that is on the $n^{th}$ floor and corresponding to the indoor non-edge grid on the $n^{th}$ floor is selected from outdoor grids on the $n^{th}$ floor. Optionally, environmental relevance may be determined according to a 3D GIS and/or information such as an engineering parameter of an antenna of a nearby base station. The environmental relevance of the first outdoor grid includes a relative position relationship between the first outdoor grid and an antenna of a base station, and the environmental relevance of the indoor edge grid that is on the $n^{th}$ floor and corresponding to the indoor non-edge grid on the $n^{th}$ floor includes a relative position relationship between the antenna of the base station and the indoor edge grid that is on the $n^{th}$ floor and corresponding to the indoor non-edge grid on the $n^{th}$ floor.

The relative position relationship between the first outdoor grid and the antenna of the base station is obtained through calculation according to the horizontal position information and height information of the first outdoor grid and horizontal position information and height information of the antenna of the base station; and the relative position relationship between the antenna of the base station and the indoor edge grid that is on the $n^{th}$ floor and corresponding to the indoor non-edge grid on the $n^{th}$ floor is obtained through calculation according to the horizontal position information and the height information of the antenna of the base station and the horizontal position information and height information of the indoor edge grid that is on the $n^{th}$ floor and corresponding to the indoor non-edge grid on the $n^{th}$ floor. That is, consistency of environmental relevance means that distances, directions and the like of two grids from their respective antennas of multiple base stations that can receive a signal are as consistent as possible. Consistency of environmental relevance may further include that two grids have more same cells or strength of cells is similar; and may also be a weighted assessment method in which a distance of a cell or an antenna of a base station, or cell signal strength is considered, which is not limited in this embodiment of the present invention. A cell or strength of a cell mentioned herein may be obtained through emulation calculation.

Further, with the first outdoor grid as a start point, a vector the same as the foregoing vector is made to determine an end point of the vector; and a second outdoor grid at which the end point of the vector is located or that is closest to the end point of the vector is acquired. More preferably, a distance between the end point of the vector and the second outdoor grid should be less than a side length of the indoor grid on the $n^{th}$ floor. If no second outdoor grid meeting this condition is found, a first outdoor grid and a corresponding second outdoor grid may be re-selected. In this way, it can be ensured that a position relationship between the first outdoor grid and the second outdoor grid is consistent with a position relationship between the indoor non-edge grid on the $n^{th}$ floor and the indoor edge grid that is on the $n^{th}$ floor and corresponding to the indoor non-edge grid on the $n^{th}$ floor. Certainly, there may also be another method for determining an outdoor grid on the $n^{th}$ floor, so as to ensure that the position relationship between the first outdoor grid and the second outdoor grid is consistent with the position relationship between the indoor non-edge grid on the $n^{th}$ floor and the indoor edge grid that is on the $n^{th}$ floor and corresponding to the indoor non-edge grid on the $n^{th}$ floor, which is not limited in this embodiment of the present invention.

It may be approximately considered that for a fixed cell, an attenuation rule between strength of a signal of the cell received by the first outdoor grid and strength of a signal of the cell received by the second outdoor grid is the same as an attenuation rule between strength of a signal of the cell received by the indoor edge grid that is on the $n^{th}$ floor and corresponding to the indoor non-edge grid on the $n^{th}$ floor and strength of a signal of the cell received by the indoor non-edge grid on the $n^{th}$ floor. Therefore, a difference between signal strength corresponding to a same cell in cell signal strength information of the first outdoor grid and the second outdoor grid is set as a first difference. A difference between signal strength corresponding to a same cell in cell signal strength information of the indoor edge grid that is on the $n^{th}$ floor and corresponding to the indoor non-edge grid on the $n^{th}$ floor and the indoor non-edge grid on the $n^{th}$ floor is set as a second difference. Assuming that the first difference is equal to the second difference, signal strength corresponding to a cell in the cell signal strength information of the indoor non-edge grid on the $n^{th}$ floor may be determined. Certainly, it may also be assumed that the first difference is unequal to the second difference, but they differ by an empirical value, so that signal strength corresponding to a corresponding cell in the cell signal strength information of the indoor non-edge grid on the $n^{th}$ floor is determined.

Similarly, emulated cell signal strength information of the indoor non-edge grid on the $n^{th}$ floor may be determined by means of emulation calculation, and on the basis of the emulated cell signal strength information, the cell signal strength information of the indoor non-edge grid on the $n^{th}$ floor is determined. Herein, reference is mainly made to a cell, which can be received by a grid, in the emulated cell signal strength information.

It should be understood that the cell signal strength information of the indoor non-edge grid on the $n^{th}$ floor may be determined according to corresponding cell signal strength information of an indoor edge grid that is on the $n^{th}$ floor and corresponding to the indoor non-edge grid on the $n^{th}$ floor and according to corresponding cell signal strength information of a pair of corresponding first outdoor grid and second outdoor grid. Preferably, multiple groups of cell signal strength information of the indoor non-edge grid on the $n^{th}$ floor may also be determined separately according to multiple indoor edge grids that are on the $n^{th}$ floor and have a position that is the same as or close to that of the indoor non-edge grid on the $n^{th}$ floor in the first direction or the second direction and according to corresponding cell signal strength information of outdoor grids corresponding to the multiple indoor edge grids; and then, averaging is performed on signal strength of cells in the multiple groups of cell signal strength information, so as to improve accuracy of the cell signal strength information.

In this way, cell signal strength information of an indoor edge grid and an indoor non-edge grid on an $n^{th}$ floor of a building may be obtained, that is, positioning matching information of any indoor grid is obtained; and the positioning matching information altogether may be referred to as a matching feature database. The method 200 is to determine cell signal strength information of an indoor grid on the $n^{th}$ floor according to cell signal strength information of an outdoor grid that is on the $n^{th}$ floor and corresponding to the indoor grid on the $n^{th}$ floor. When n is equal to 1 or when n is greater than 1, there are many methods for determining the cell signal strength information of the outdoor grid on the $n^{th}$ floor. The following separately describes the methods in detail.

Optionally, when n is equal to 1, the acquiring cell signal strength information of the outdoor grid that is on the $n^{th}$ floor and corresponding to the indoor grid on the $n^{th}$ floor may include:

acquiring test data of an outdoor grid that is on a first floor and corresponding to an indoor grid on the first floor, where the test data includes horizontal position information and cell signal strength information of the outdoor grid that is on the first floor and corresponding to the indoor grid on the first floor;

deleting error data from the test data according to a variation rule that cell signal strength is attenuated with a distance, where the variation rule that cell signal strength is attenuated with a distance is obtained according to cell signal strength information of multiple outdoor grids on the first floor and horizontal position information of the multiple outdoor grids on the first floor; and determining that cell signal strength information in the test data from which the error data is deleted is the cell signal strength information of the outdoor grid that is on the first floor and corresponding to the indoor grid on the first floor.

Specifically, acquiring the cell signal strength information of the outdoor grid on the first floor may be implemented by acquiring and processing the test data of the outdoor grid on the first floor. The test data may include DT data and/or terminal data, and content of the test data includes the horizontal position information and the cell signal strength information of the outdoor grid on the first floor. Specifically, the DT data refers to data obtained by using a vehicle-mounted device with a terminal to collect a signal or information related to a wireless air interface, and the information includes at least longitude and latitude position information of a test point, multiple cells received by a terminal corresponding to a position, and information such as signal strength corresponding to these cells. The terminal data may be Assisted Global Positioning System (AGPS) longitude and latitude position information collected by a terminal or application software in a terminal, and information such as a cell identity and signal strength that are of a received signal and acquired by using an MR. In addition, the test data may further include other information, for example, height information measured by using a barometer function or the like of a terminal, which is not limited in this embodiment of the present invention.

When the cell signal strength information of the outdoor grid on the first floor is determined according to the test data, only the collected DT data may be used, or only the terminal data may be used, or the DT data and the terminal data may be combined and complement each other. Moreover, processing such as screening and smoothing, discrete elimination may further be performed on the test data, which is not limited in this embodiment of the present invention. Moreover, one or more pieces of test data may be included in one outdoor grid on the first floor. When a grid includes multiple pieces of test data, an average value of strength information of multiple cells corresponding to the multiple pieces of test data, or a smooth-processed value may be approximately used as signal strength corresponding to the grid.

Figure 6:
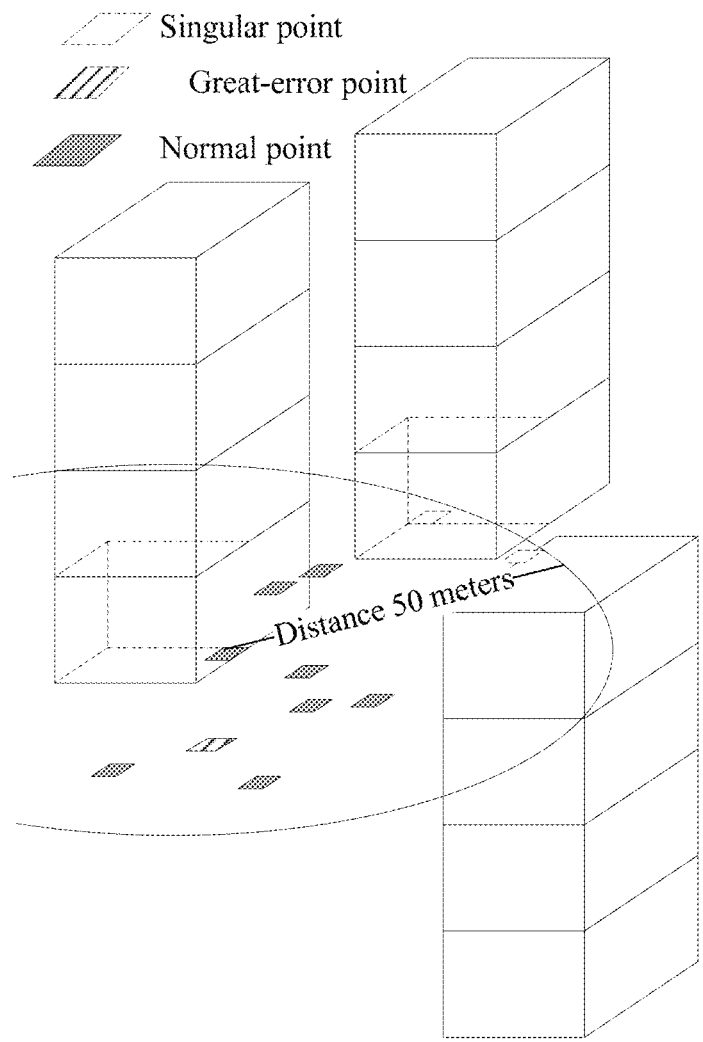
FIG. 6 is a schematic diagram of a method for determining cell signal strength information of an indoor grid according to another embodiment of the present invention.

As a specific example, as shown in FIG. 6, an indoor edge grid on a first floor of a building may be used as a reference, and multiple outdoor test points are selected within a range of 50 to 60 meters from the first outdoor floor. A difference between cell signal strength of the outdoor test points is calculated. In a normal case of no obstruction, there is a particular variation rule that cell signal strength is attenuated with a distance. However, when there is an obstruction of a building or other objects between test points, a singular point of signal strength that is not in conformity with the variation rule may appear. Moreover, some points with a great signal strength error may also be found. According to this, the singular point and an outdoor test point with a great error are deleted, and cell signal strength information in test data from which error data is deleted is used as the cell signal strength information of the outdoor grid on the first floor, so as to make 3D indoor positioning matching information more accurate. In FIG. 6, the number of singular points, the number of great-error points, and the number of normal points are merely exemplary, which constitutes no limitation on this embodiment of the present invention.

For example, according to the variation rule that cell signal strength of the multiple outdoor grids on the first floor is attenuated with a distance, compared with signal strength of the reference grid to be compared, signal strength of an outdoor grid on the first floor should be attenuated by 5 dB, but the signal strength of the outdoor grid on the first floor is attenuated by 20 dB abnormally; and then, it may be considered that the outdoor grid on the first floor may be blocked, and the outdoor grid on the first floor is a singular point and should be deleted. Alternatively, signal strength of another outdoor grid on the first floor should be attenuated by 5 dB, but the signal strength of the outdoor grid on the first floor increases by 5 dB abnormally; and then, it may be considered that test data of the outdoor grid on the first floor has a great error and should be deleted.

Further, after the deleting error data from the test data according to a variation rule that cell signal strength is attenuated with a distance, the method 200 may further include:

performing, according to cell signal strength information of multiple outdoor grids that are on the first floor and whose distance from the outdoor grid that is on the first floor and corresponding to the indoor grid on the first floor is less than a second threshold, smooth processing on the cell signal strength information in the test data from which the error data is deleted; and the determining that cell signal strength information in the test data from which the error data is deleted is the cell signal strength information of the outdoor grid that is on the first floor and corresponding to the indoor grid on the first floor includes:

determining that the smooth-processed cell signal strength information in the test data from which the error data is deleted is the cell signal strength information of the outdoor grid that is on the first floor and corresponding to the indoor grid on the first floor.

Specifically, considering that a measurement value of a single outdoor test point may have a great random error, smooth processing may be performed on cell signal strength in the test data. A specific implementation manner may be as follows: test data corresponding to an outdoor test point is selected; multiple outdoor grids that are on the first floor and whose distance from the test point is the second threshold are determined; and according to cell signal strength information of the multiple outdoor grids that are on the first floor and whose distance from the test point is the second threshold, smooth processing is performed on cell signal strength information in the test data corresponding to the test point. For example, averaging is performed on signal strength corresponding to same cells in the test data, and an average value is used as signal strength of a corresponding cell of the selected test point. The smooth-processed cell signal strength information in the test data from which the error data is deleted is used as the cell signal strength information of the outdoor grid that is on the first floor and corresponding to the indoor grid on the first floor.

Preferably, the second threshold may be 10 meters, and according to a practical data test, DT data corresponding to a test point within a range of 10 meters has relatively high relevance. The second threshold may also be another different value, for example, 20 meters or 30 meters, which is not limited in this embodiment of the present invention.

Optionally, when n is greater than 1, the acquiring cell signal strength information of the outdoor grid that is on the $n^{th}$ floor and corresponding to the indoor grid on the $n^{th}$ floor may include:

determining, through emulation calculation and according to engineering parameter information of the antenna of the base station, emulated cell signal strength information of the outdoor grid that is on the $n^{th}$ floor and corresponding to the indoor grid on the $n^{th}$ floor and emulated cell signal strength information of an outdoor grid on a first floor, where horizontal position information of the outdoor grid on the first floor is consistent with horizontal position information of the outdoor grid that is on the $n^{th}$ floor and corresponding to the indoor grid on the $n^{th}$ floor; and determining, according to the emulated cell signal strength information of the outdoor grid that is on the $n^{th}$ floor and corresponding to the indoor grid on the $n^{th}$ floor, the emulated cell signal strength information of the outdoor grid on the first floor, and cell signal strength information of the outdoor grid on the first floor, the cell signal strength information of the outdoor grid that is on the $n^{th}$ floor and corresponding to the indoor grid on the $n^{th}$ floor.

Figure 7:
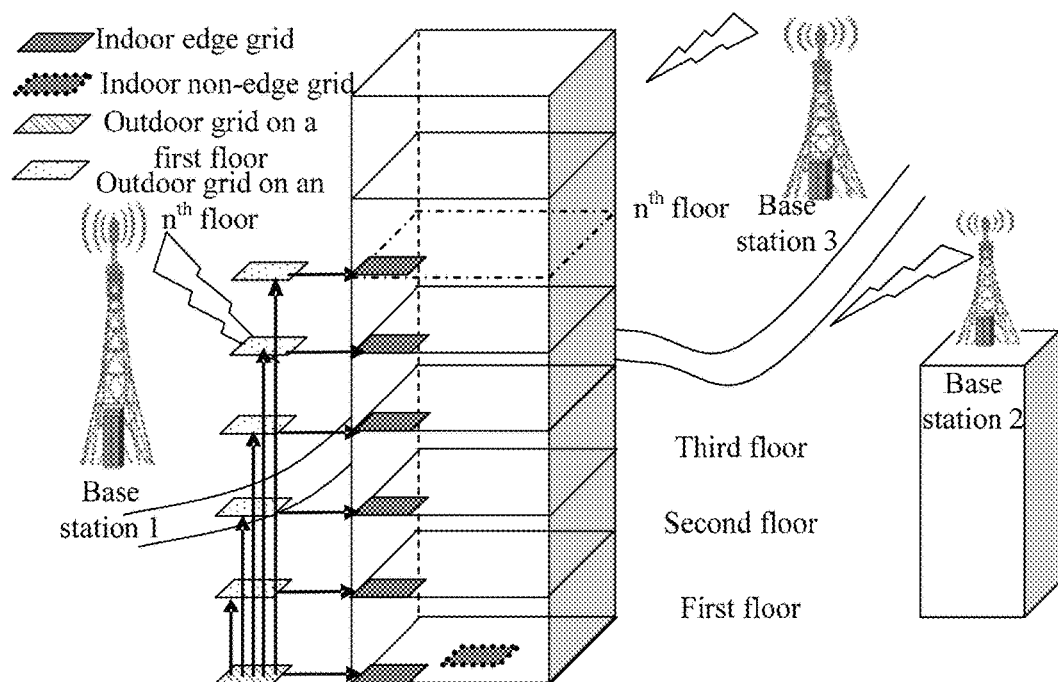
FIG. 7 is a schematic diagram of a method for determining cell signal strength information of an indoor grid according to another embodiment of the present invention.

Specifically, as shown in FIG. 7, the emulated cell signal strength information of the outdoor grid on the first floor and the emulated cell signal strength information of the outdoor grid on the $n^{th}$ floor may be determined according to the engineering parameter information of the antenna of the base station and by using an emulation calculation method such as ray tracing, where the outdoor grid on the $n^{th}$ floor and the outdoor grid on the first floor have same or similar horizontal position information, that is, a position of the outdoor grid on the $n^{th}$ floor in the first direction and the second direction is as close as possible to a position of the outdoor grid on the first floor in the first direction and the second direction, and a height of the outdoor grid on the $n^{th}$ floor is corresponding to the $n^{th}$ floor of a building.

A difference between signal strength of a cell in the emulated cell signal strength information of the outdoor grid on the first floor and signal strength of the cell in the emulated cell signal strength information of the outdoor grid that is on the $n^{th}$ floor and corresponding to the indoor grid on the $n^{th}$ floor is set as a third difference. A difference between signal strength of a cell in the cell signal strength information of the outdoor grid on the first floor and signal strength of the cell in the cell signal strength information of the outdoor grid that is on the $n^{th}$ floor and corresponding to the indoor grid on the $n^{th}$ floor is set as a fourth difference. Assuming that the third difference is equal to the fourth difference, the signal strength of the cell in the cell signal strength information of the outdoor grid that is on the $n^{th}$ floor and corresponding to the indoor grid on the $n^{th}$ floor may be determined. Certainly, it may also be assumed that the third difference is unequal to the fourth difference, but they differ by an empirical value, so that the signal strength of the cell in the cell signal strength information of the outdoor grid that is on the $n^{th}$ floor and corresponding to the indoor grid on the $n^{th}$ floor is determined.

Similarly, reference may be made to information about a cell in the emulated cell signal strength information of the outdoor grid that is on the $n^{th}$ floor and corresponding to the indoor grid on the $n^{th}$ floor, to complement a cell in the cell signal strength information of the outdoor grid that is on the $n^{th}$ floor and corresponding to the indoor grid on the $n^{th}$ floor.

Figure 8:
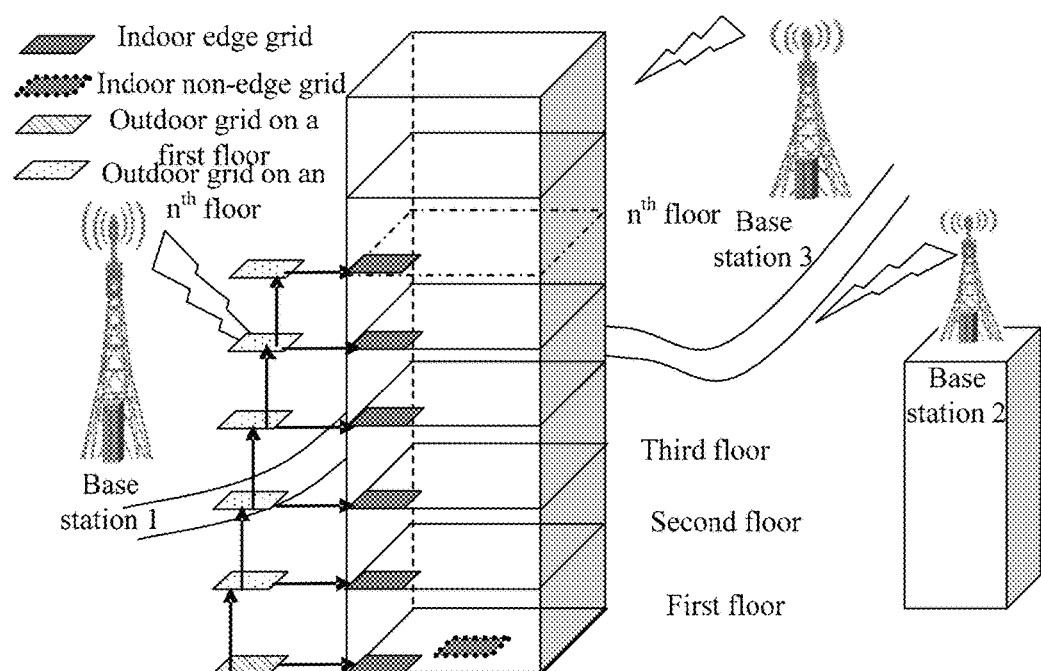
FIG. 8 is a schematic diagram of a method for determining cell signal strength information of an indoor grid according to another embodiment of the present invention.

Optionally, in the cell signal strength information of the outdoor grid on the first floor and the cell signal strength information of the outdoor grid on the $n^{th}$ floor, a difference between a cell corresponding to a grid on the $n^{th}$ floor and a cell corresponding to a grid on the first floor may be relatively great. To further improve accuracy of cell signal strength information of a grid on an $n^{th}$ floor of a building, cell signal strength information of outdoor grids on all floors may be determined floor by floor. For example, as shown in FIG. 8, cell signal strength information of an outdoor grid on a third floor may be determined according to emulated cell signal strength information of outdoor grids on a second floor and the third floor and cell signal strength information of the outdoor grid on the second floor.

Accordingly, when n is greater than 1, the acquiring cell signal strength information of the outdoor grid that is on the $n^{th}$ floor and corresponding to the indoor grid on the $n^{th}$ floor may include:

determining, through emulation calculation and according to engineering parameter information of the antenna of the base station, emulated cell signal strength information of an outdoor grid on an $(n-1)^{th}$ floor and emulated cell signal strength information of the outdoor grid on the $n^{th}$ floor, where position information in the first direction and the second direction of both the outdoor grid on the $(n-1)^{th}$ floor and the outdoor grid on the $n^{th}$ floor is consistent with position information in the first direction and the second direction of the outdoor grid that is on the $(n-1)^{th}$ floor and corresponding to the indoor grid on the $(n-1)^{th}$ floor; a height of the outdoor grid on the $(n-1)^{th}$ floor is equal to a height of the indoor grid on the $(n-1)^{th}$ floor; and a height of the outdoor grid on the $n^{th}$ floor is equal to a height of the indoor grid on the $n^{th}$ floor;

determining cell signal strength information of the outdoor grid on the $(n-1)^{th}$ floor; and determining the cell signal strength information of the outdoor grid on the $n^{th}$ floor according to the emulated cell signal strength information of the outdoor grid on the $(n-1)^{th}$ floor, the emulated cell signal strength information of the outdoor grid on the $n^{th}$ floor, and the cell signal strength information of the outdoor grid on the $(n-1)^{th}$ floor.

Specifically, the cell signal strength information of the outdoor grid on the $(n-1)^{th}$ floor may be known, for example, the cell signal strength information of the outdoor grid on the $(n-1)^{th}$ floor has been obtained by means of measurement, or obtained in a process of calculating cell signal strength information of a grid on another floor. The cell signal strength information of the outdoor grid on the $(n-1)^{th}$ floor may also be unknown, and in this case, the following steps may be performed repeatedly until the cell signal strength information of the outdoor grid on the $(n-1)^{th}$ floor is obtained, where an initial value of i is set to 1:

determining, through emulation calculation and according to engineering parameter information of an antenna of a base station, emulated cell signal strength information of an outdoor grid on an $i^{th}$ floor and emulated cell signal strength information of an outdoor grid on an $(i+1)^{th}$ floor, where both horizontal position information of the outdoor grid on the $i^{th}$ floor and horizontal position information of the outdoor grid on the $(i+1)^{th}$ floor are consistent with horizontal position information of the outdoor grid that is on the $n^{th}$ floor and corresponding to the indoor grid on the $n^{th}$ floor; a height of the outdoor grid on the $i^{th}$ floor is equal to a height of an indoor grid that is on the $i^{th}$ floor; and a height of the outdoor grid on the $(i+1)^{th}$ floor is equal to a height of an indoor grid on the $(i+1)^{th}$ floor;

determining cell signal strength information of the outdoor grid on the $i^{th}$ floor;

determining cell signal strength information of the outdoor grid on the $(i+1)^{th}$ floor according to the emulated cell signal strength information of the outdoor grid on the $i^{th}$ floor, the emulated cell signal strength information of the outdoor grid on the $(i+1)^{th}$ floor, and the cell signal strength information of the outdoor grid on the $i^{th}$ floor; and setting i to i+1.

As a specific example, to determine cell signal strength information of an outdoor grid on a third floor, cell signal strength information of an outdoor grid on a second floor may be first determined according to emulated cell signal strength information of outdoor grids on a first floor and the second floor and cell signal strength information of the outdoor grid on the first floor; and then, the cell signal strength information of the outdoor grid on the third floor is determined according to the emulated cell signal strength information of the outdoor grids on the second floor and the third floor and the cell signal strength information of the outdoor grid on the second floor.

Preferably, smooth processing may be performed on emulated cell signal strength information, which is determined through emulation calculation, of an outdoor grid on any floor (for example, an $x^{th}$ floor). For example, to perform smooth processing on an emulation point corresponding to an outdoor grid on the $x^{th}$ floor, y (for example, p is 5) emulation points that are closest to the emulation point corresponding to the outdoor grid on the $x^{th}$ floor may be selected in a horizontal plane of the $x^{th}$ floor, where a greatest distance between one of the y emulation points and the emulation point on which smooth processing is to be performed is d. A range of d may be determined according to a size of outdoor grid obtained by means of division. Generally, d may be 15 to 35 meters, and more preferably, d may be 25 meters. Averaging is performed on signal strength of same cells corresponding to the y emulation points, and an average value is used as signal strength of a cell in cell signal strength information corresponding to the emulation point on which smooth processing is to be performed.

It should be understood that in each embodiment of the present invention, reference may be made to emulated cell signal strength information obtained through emulation calculation, to determine cell signal strength information of each outdoor and indoor floor. That is, reference is made to information about a cell in the emulated cell signal strength information, so as to make the cell signal strength information more accurate and complete. Corresponding description of a specific reference method has been made in the foregoing; and for brevity, details are not described herein again.

Therefore, according to the method for determining cell signal strength information of an indoor grid provided in this embodiment of the present invention, an outdoor grid that is on an $n^{th}$ floor and corresponding to an indoor grid on the $n^{th}$ floor is determined according to horizontal position information of the indoor grid on the $n^{th}$ floor; and cell signal strength information of the indoor grid on the $n^{th}$ floor may be determined according to the acquired cell signal strength information of the corresponding outdoor grid on the $n^{th}$ floor, so that high-accuracy indoor cell signal strength information can be obtained, so as to further implement high-accuracy 3D indoor positioning.

The method 200 for determining cell signal strength information of an indoor grid is based on cell signal strength information of outdoor space. Outdoor conditions are fully considered to reproduce an outdoor scene, so that a relative variation of a signal on different outdoor floors meets an actual situation; accuracy of cell signal strength information of an indoor grid on each floor of a building is improved; and further, high-accuracy 3D indoor positioning matching information may be obtained. This method is more applicable to a higher floor. On a higher floor, a cell that can be received by a terminal and signal strength of the cell may be greatly different from those on a lower floor. For lower floors except a first floor, for example, a second floor to a fifth floor, a variation of cell signal strength information of the lower floors is in conformity with a specific rule. Cell signal strength information of a grid on these floors may be determined by using a simpler method, which is described in detail in a method 300.

Figure 9:
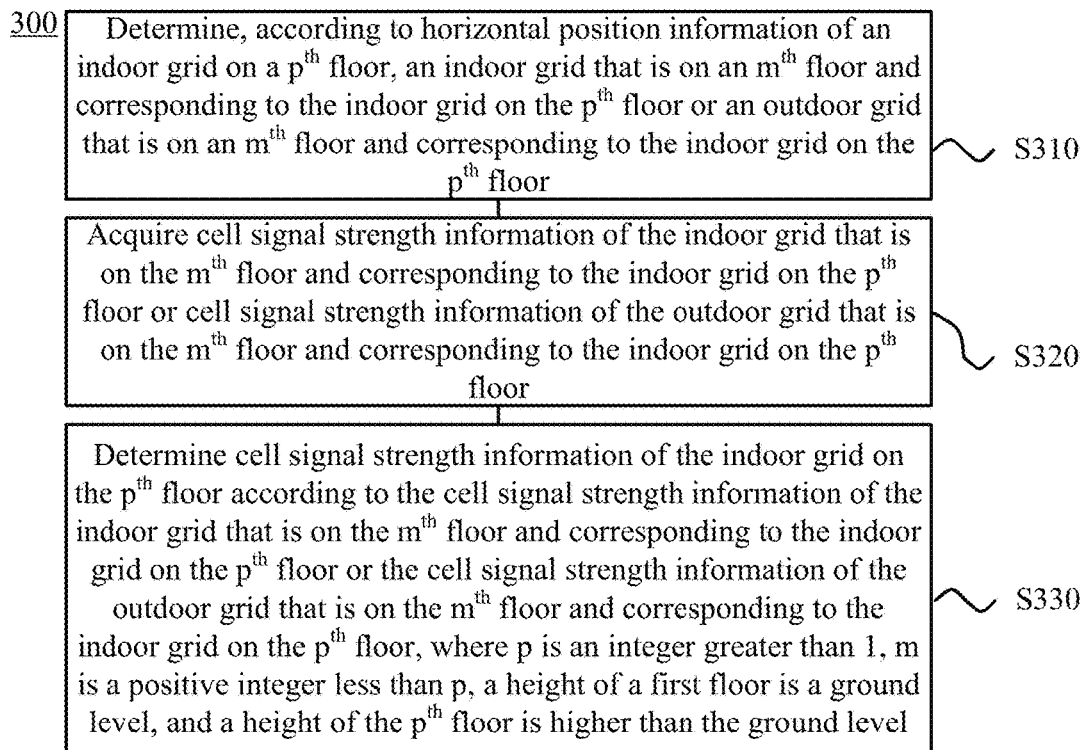
FIG. 9 is a schematic flowchart of a method for determining cell signal strength information of an indoor grid according to another embodiment of the present invention.

FIG. 9 is a schematic flowchart of a method 300 for determining cell signal strength information of an indoor grid according to another embodiment of the present invention. The method 300 may be executed by an apparatus for determining cell signal strength information of an indoor grid, or may be executed by a corresponding module of an indoor positioning apparatus. As shown in FIG. 9, the method 300 includes:

S310. Determine, according to horizontal position information of an indoor grid on a $p^{th}$ floor, an indoor grid that is on an $m^{th}$ floor and corresponding to the indoor grid on the $p^{th}$ floor or an outdoor grid that is on an $m^{th}$ floor and corresponding to the indoor grid on the $p^{th}$ floor.

S320. Acquire cell signal strength information of the indoor grid that is on the $m^{th}$ floor and corresponding to the indoor grid on the $p^{th}$ floor or cell signal strength information of the outdoor grid that is on the $m^{th}$ floor and corresponding to the indoor grid on the $p^{th}$ floor.

S330. Determine cell signal strength information of the indoor grid on the $p^{th}$ floor according to the cell signal strength information of the indoor grid that is on the $m^{th}$ floor and corresponding to the indoor grid on the $p^{th}$ floor or the cell signal strength information of the outdoor grid that is on the $m^{th}$ floor and corresponding to the indoor grid on the $p^{th}$ floor, where p is an integer greater than 1, m is a positive integer less than p, a height of the first floor is a ground level, and a height of the $p^{th}$ floor is higher than the ground level.

Generally, for a lower $p^{th}$ floor of a building except a first floor, for example, a second indoor floor to a fifth indoor floor, due to blocking from a building, a feature of cell signal strength information of an indoor grid on the $p^{th}$ floor is similar to that on an $m^{th}$ indoor floor, especially the first floor of the building. In particular, the rule is more obvious at an edge grid. Therefore, cell signal strength information of an indoor grid on a $p^{th}$ floor may be determined according to cell signal strength information of an indoor grid on an $m^{th}$ floor of a building.

Therefore, according to the method for determining cell signal strength information of an indoor grid provided in this embodiment of the present invention, an outdoor grid that is on an $m^{th}$ floor and corresponding to an indoor grid on a $p^{th}$ floor or an indoor grid that is on an $m^{th}$ floor and corresponding to an indoor grid on a $p^{th}$ floor is determined according to horizontal position information of the indoor grid on the $p^{th}$ floor; and cell signal strength information of the indoor grid on the $p^{th}$ floor may be determined according to the acquired cell signal strength information of the corresponding outdoor grid or indoor grid on the $m^{th}$ floor, so that high-accuracy indoor cell signal strength information can be obtained, so as to further implement high-accuracy 3D indoor positioning.

It should be understood that cell signal strength information of an indoor grid on a first floor or an outdoor grid on a first floor, and an indoor grid or an outdoor grid on an $m^{th}$ floor except the first floor may be cell signal strength information in corresponding indoor or outdoor test data; may be cell signal strength information in emulated data obtained through calculation; or may be cell signal strength information determined by using a method in another embodiment of the present invention, which is not limited in this embodiment of the present invention. The following describes the method 300 in detail by using an example in which the cell signal strength information of the indoor grid on the $p^{th}$ floor is determined according to the cell signal strength information of the indoor grid or the outdoor grid on the first floor. A process in which the cell signal strength information of the indoor grid on the $p^{th}$ floor is determined according to the cell signal strength information of the indoor grid or the outdoor grid on the $m^{th}$ floor is similar to this, and details are not described herein again.

Optionally, as an embodiment, when the indoor grid on the $p^{th}$ floor is an indoor edge grid on the $p^{th}$ floor, the determining, according to horizontal position information of an indoor grid on a $p^{th}$ floor, an indoor grid that is on an $m^{th}$ floor and corresponding to the indoor grid on the $p^{th}$ floor or an outdoor grid that is on an $m^{th}$ floor and corresponding to the indoor grid on the $p^{th}$ floor may include:

determining an indoor edge grid that is on the $m^{th}$ floor and corresponding to the indoor edge grid on the $p^{th}$ floor, where horizontal position information of the indoor edge grid that is on the $m^{th}$ floor and corresponding to the indoor edge grid on the $p^{th}$ floor is consistent with the horizontal position information of the indoor grid on the $p^{th}$ floor; and the determining cell signal strength information of the indoor grid on the $m^{th}$ floor according to the cell signal strength information of the indoor grid that is on the $m^{th}$ floor and corresponding to the indoor grid on the $p^{th}$ floor or the cell signal strength information of the outdoor grid that is on the $m^{th}$ floor and corresponding to the indoor grid on the $p^{th}$ floor may include:

determining cell signal strength information of the indoor edge grid on the $p^{th}$ floor according to cell signal strength information of the indoor edge grid that is on the $m^{th}$ floor and corresponding to the indoor edge grid on the $p^{th}$ floor and according to a loss relationship of signal strength between floors, where m is equal to 1.

Specifically, if a horizontal position of a terminal is fixed, that is, a position of the terminal in a first direction and a second direction is fixed, and an antenna height of a base station is relatively high, a higher position of the terminal indicates stronger signal strength received by the terminal. Therefore, in a case in which an antenna height of a base station is much higher than a height of a building, signal strength of a cell received by an indoor edge grid on a $p^{th}$ floor of a building may be approximately considered as an enhancement to signal strength of the cell received by an indoor edge grid that is on a first floor and corresponding to the indoor edge grid on the $p^{th}$ floor, where an enhanced value is related to a loss relationship of signal strength between floors. Horizontal position information of the indoor edge grid that is on the first floor and corresponding to the indoor edge grid on the $p^{th}$ floor is consistent with the horizontal position information of the indoor grid on the $p^{th}$ floor. Herein, consistency of horizontal position information means that a position of the indoor edge grid on the $p^{th}$ floor in the first direction and the second direction is same as or close to a position, in the first direction and the second direction, of the indoor edge grid that is on the first floor and corresponding to the indoor edge grid on the $p^{th}$ floor.

Figure 10:
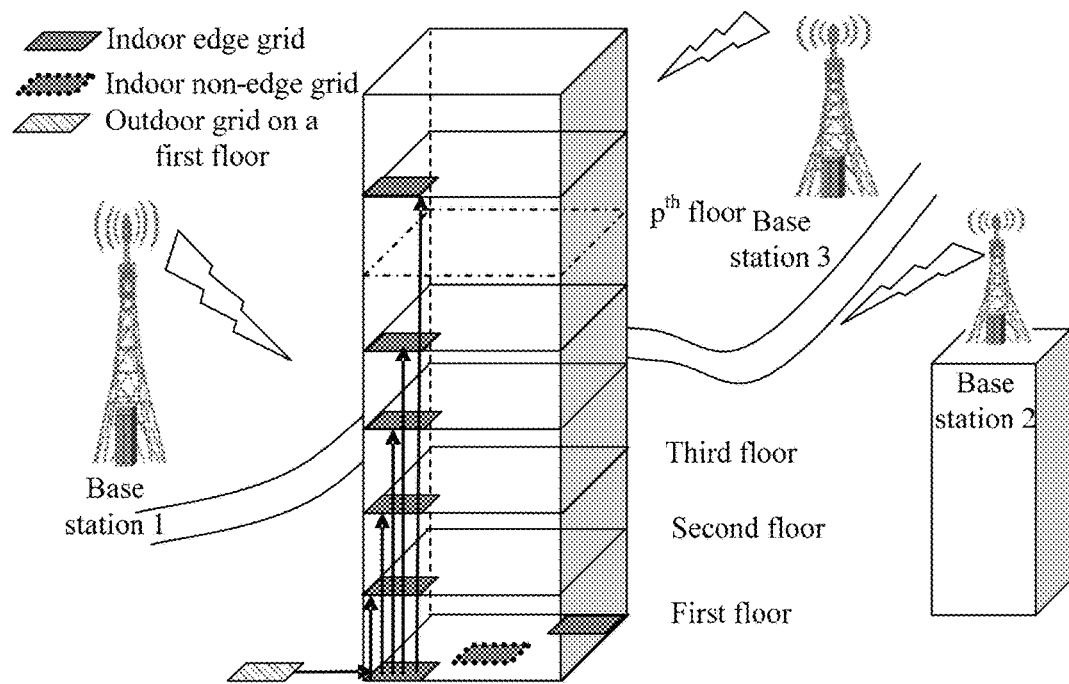
FIG. 10 is a schematic diagram of a method for determining cell signal strength information of an indoor grid according to another embodiment of the present invention.

For example, as shown in FIG. 10, signal strength may increase by q dB as a position at which the terminal is located is raised by one floor, that is, considering a floor penetration loss (Floor Penetrate Loss, Floor-PLoss), signal strength of the indoor edge grid on the $p^{th}$ floor is (p−1)q dB stronger than that of the indoor edge grid on the first floor. Selection of a value of m is related to a factor such as a frequency band. A range of q may be 3 to 10, and more preferably, a value of q may be 3. Therefore, the cell signal strength information of the indoor grid on the $p^{th}$ floor may be obtained according to cell signal strength information of an indoor grid on the first floor.

Preferably, emulation calculation may be performed on the indoor grid on the $p^{th}$ floor to obtain emulated cell signal strength information of the indoor grid on the $p^{th}$ floor. After a cell in cell signal strength information of the indoor edge grid that is on the first floor and corresponding to the indoor edge grid on the $p^{th}$ floor is compared with a cell in the emulated cell signal strength information of the indoor grid on the $p^{th}$ floor, a same cell is used as a cell of the indoor edge grid on the $p^{th}$ floor; and for a cell that exists only in the cell signal strength information of the indoor grid on the first floor or a cell that exists only in the emulated cell signal strength information of the indoor edge grid on the $p^{th}$ floor, it is required to determine, with reference to engineering parameter information of an antenna, whether a signal of the cell should exist at the indoor edge grid on the $p^{th}$ floor, and if a signal of the cell should exist at the indoor edge grid on the $p^{th}$ floor, the cell is also used as a cell of the indoor edge grid on the $p^{th}$ floor.

For a cell that exists in both the emulated cell signal strength information of the indoor edge grid on the $p^{th}$ floor and the cell signal strength information of the indoor edge grid that is on the first floor and corresponding to the indoor edge grid on the $p^{th}$ floor, the cell signal strength information of the indoor edge grid on the $p^{th}$ floor may be calculated by using the foregoing method in which the floor penetration loss is considered. For a cell that exists in the emulated cell signal strength information of the indoor edge grid on the $p^{th}$ floor but does not exist in the cell signal strength information of the indoor edge grid that is on the first floor and corresponding to the indoor edge grid on the $p^{th}$ floor, signal strength corresponding to the cell in the emulated cell signal strength information of the indoor edge grid on the $p^{th}$ floor may be selected as signal strength of the indoor edge grid on the $p^{th}$ floor.

Optionally, as another embodiment, when the indoor grid on the $p^{th}$ floor is an indoor non-edge grid on the $p^{th}$ floor, the determining, according to horizontal position information of an indoor grid on a $p^{th}$ floor, an indoor grid that is on an $m^{th}$ floor and corresponding to the indoor grid on the $p^{th}$ floor or an outdoor grid that is on an $m^{th}$ floor and corresponding to the indoor grid on the $p^{th}$ floor may include:

determining an indoor edge grid that is on the $p^{th}$ floor in any direction of the horizontal position information and corresponding to the indoor non-edge grid on the $p^{th}$ floor; and determining a first outdoor grid and a second outdoor grid, where both the first outdoor grid and the second outdoor grid are outdoor grids on the $m^{th}$ floor, a relative position relationship between the first outdoor grid and the second outdoor grid is consistent with a relative position relationship between the indoor non-edge grid on the $p^{th}$ floor and the indoor edge grid that is on the $p^{th}$ floor and corresponding to the indoor non-edge grid on the $p^{th}$ floor, environmental relevance of the first outdoor grid is consistent with environmental relevance of the indoor edge grid that is on the $p^{th}$ floor and corresponding to the indoor non-edge grid on the $p^{th}$ floor, the relative position relationship between the first outdoor grid and the second outdoor grid is obtained through calculation according to horizontal position information of the first outdoor grid and horizontal position information of the second outdoor grid, and the relative position relationship between the indoor non-edge grid on the $p^{th}$ floor and the indoor edge grid that is on the $p^{th}$ floor and corresponding to the indoor non-edge grid on the $p^{th}$ floor is obtained through calculation according to horizontal position information of the indoor non-edge grid on the $p^{th}$ floor and horizontal position information of the indoor edge grid that is on the $p^{th}$ floor and corresponding to the indoor non-edge grid on the $p^{th}$ floor; and the determining cell signal strength information of the indoor grid on the $mp^{th}$ floor according to the cell signal strength information of the indoor grid that is on the $m^{th}$ floor and corresponding to the indoor grid on the $p^{th}$ floor or the cell signal strength information of the outdoor grid that is on the $m^{th}$ floor and corresponding to the indoor grid on the $p^{th}$ floor may include:

determining cell signal strength information of the indoor non-edge grid on the $p^{th}$ floor according to cell signal strength information of the first outdoor grid, cell signal strength information of the second outdoor grid, and cell signal strength information of the indoor edge grid that is on the $p^{th}$ floor and corresponding to the indoor non-edge grid on the $p^{th}$ floor, where m is equal to 1.

The environmental relevance of the first outdoor grid includes a relative position relationship between the first outdoor grid and an antenna of a base station, and the environmental relevance of the indoor edge grid that is on the $p^{th}$ floor and corresponding to the indoor non-edge grid on the $p^{th}$ floor includes a relative position relationship between the antenna of the base station and the indoor edge grid that is on the $p^{th}$ floor and corresponding to the indoor non-edge grid on the $p^{th}$ floor.

The relative position relationship between the first outdoor grid and the antenna of the base station is obtained through calculation according to the horizontal position information and height information of the first outdoor grid and horizontal position information and height information of the antenna of the base station; and the relative position relationship between the antenna of the base station and the indoor edge grid that is on the $p^{th}$ floor and corresponding to the indoor non-edge grid on the $p^{th}$ floor is obtained through calculation according to the horizontal position information and the height information of the antenna of the base station and the horizontal position information and height information of the indoor edge grid that is on the $p^{th}$ floor and corresponding to the indoor non-edge grid on the $p^{th}$ floor.

A method for determining cell signal strength information of an indoor non-edge grid on a $p^{th}$ floor is similar to a method, in the method 200, for determining positioning matching information of a non-edge grid on an $n^{th}$ floor of a building according to cell signal strength information of an indoor edge grid on the $n^{th}$ floor and cell signal strength information of an outdoor grid on the $n^{th}$ floor. For brevity, details are not described herein again.

Therefore, according to the method for determining cell signal strength information of an indoor grid provided in this embodiment of the present invention, an outdoor grid that is on an $m^{th}$ floor and corresponding to an indoor grid on a $p^{th}$ floor or an indoor grid that is on an $m^{th}$ floor and corresponding to an indoor grid on a $p^{th}$ floor is determined according to horizontal position information of the indoor grid on the $p^{th}$ floor; and cell signal strength information of the indoor grid on the $p^{th}$ floor may be determined according to the acquired cell signal strength information of the corresponding outdoor grid or indoor grid on the $m^{th}$ floor, so that high-accuracy indoor cell signal strength information can be obtained, so as to further implement high-accuracy 3D indoor positioning.

It should be understood that the cell signal strength information of the indoor non-edge grid on the $p^{th}$ floor may also be determined according to cell signal strength information of an indoor non-edge grid on another floor with reference to the loss relationship of signal strength between floors, which is not limited in this embodiment of the present invention.

The foregoing separately describes in detail the method for determining cell signal strength information of an indoor grid on an $n^{th}$ floor according to cell signal strength information of an outdoor grid on the $n^{th}$ floor, and the method for determining cell signal strength information of an indoor grid on a $p^{th}$ floor (when n is unequal to 1, the $n^{th}$ floor may be the same as the $p^{th}$ floor) according to cell signal strength information of an outdoor grid or an indoor grid on an $m^{th}$ floor. Cell signal strength information determined by using the former method is more accurate, and the former method is applicable to a higher floor of a building; and a process of determining cell signal strength information by using the latter method is relatively simple, and the latter method is applicable to a lower floor of a building. Therefore, the two methods may be combined, for example, when cell signal strength information of a grid in a building is determined, a floor may be determined first: When a floor n is less than or equal to N, the latter method is used to determine cell signal strength information of a grid on this floor; and when a floor n of the building is greater than N, the former method is used to determine cell signal strength information of a grid on this floor. Positioning matching information of all floors of the entire building may be obtained by combining positioning matching information of floors separately determined by using the two methods.

Therefore, according to the method for determining cell signal strength information of an indoor grid provided in this embodiment of the present invention, an outdoor grid that is on a first floor and corresponding to an indoor grid on an $n^{th}$ floor or an indoor grid that is on a first floor and corresponding to an indoor grid on an $n^{th}$ floor is determined according to horizontal position information of the indoor grid on the $n^{th}$ floor; and cell signal strength information of the indoor grid on the $n^{th}$ floor may be determined according to the acquired cell signal strength information of the corresponding outdoor grid or indoor grid on the first floor, so that high-accuracy indoor cell signal strength information can be obtained, so as to further implement high-accuracy 3D indoor positioning.

Optionally, as still another embodiment, cell signal strength information of a non-edge grid in the indoor grid is determined according to the following steps:

determining, according to horizontal position information of an indoor non-edge grid on a $k^{th}$ floor, an indoor edge grid that is on the $k^{th}$ floor and whose distance from the indoor non-edge grid on the $k^{th}$ floor is less than a third threshold, where the distance is obtained through calculation according to horizontal position information of the grids, and k is an integer greater than or equal to 1;

acquiring cell signal strength information of the indoor edge grid that is on the $k^{th}$ floor and whose distance from the indoor non-edge grid on the $k^{th}$ floor is less than the third threshold;

determining, through emulation calculation and according to engineering parameter information of an antenna of a base station, emulated cell signal strength information of the indoor edge grid that is on the $k^{th}$ floor and whose distance from the indoor non-edge grid on the $k^{th}$ floor is less than the third threshold and emulated cell signal strength information of the indoor non-edge grid on the $k^{th}$ floor; and determining cell signal strength information of the indoor non-edge grid on the $k^{th}$ floor according to the emulated cell signal strength information of the indoor edge grid that is on the $k^{th}$ floor and whose distance from the indoor non-edge grid on the $k^{th}$ floor is less than the third threshold, the emulated cell signal strength information of the indoor non-edge grid on the $k^{th}$ floor, and the cell signal strength information of the indoor edge grid that is on the $k^{th}$ floor and whose distance from the indoor non-edge grid on the $k^{th}$ floor is less than the third threshold.

Specifically, for an indoor non-edge grid on any floor such as the indoor non-edge grid on the $k^{th}$ floor, its cell signal strength information may be determined according to its emulated cell signal strength information, and the cell signal strength information and the emulated cell signal strength information of the indoor edge grid that is on the $k^{th}$ floor and whose distance from the indoor non-edge grid on the $k^{th}$ floor is less than the third threshold. The third threshold may be 20 meters, 30 meters, or 50 meters. Preferably, an indoor edge grid that is on the $k^{th}$ floor and closest to the indoor non-edge grid on the $k^{th}$ floor may be selected.

Figure 11:
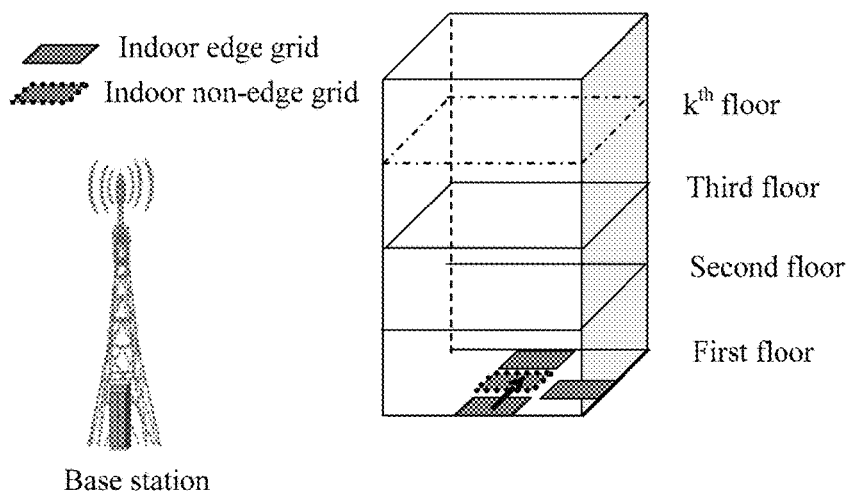
FIG. 11 is a schematic diagram of a method for determining cell signal strength information of an indoor grid according to still another embodiment of the present invention.

As shown in FIG. 11, the indoor edge grid that is on the $k^{th}$ floor and closest to the indoor non-edge grid on the $k^{th}$ floor is selected; and emulated cell signal strength information of the indoor non-edge grid on the $k^{th}$ floor and emulated cell signal strength information of the indoor edge grid that is on the $k^{th}$ floor and closest to the indoor non-edge grid on the $k^{th}$ floor may be determined by using an emulation calculation method such as ray tracing and according to engineering parameter information of an antenna of a base station.

A difference between signal strength of a cell in the emulated cell signal strength information of the indoor non-edge grid on the $k^{th}$ floor and signal strength of the cell in the emulated cell signal strength information of the indoor edge grid that is on the $k^{th}$ floor and closest to the indoor non-edge grid on the $k^{th}$ floor is set as a fifth difference. A difference between signal strength of a cell in the cell signal strength information of the indoor non-edge grid on the $k^{th}$ floor and signal strength of the cell in the cell signal strength information of the indoor edge grid that is on the $k^{th}$ floor and closest to the indoor non-edge grid on the $k^{th}$ floor is set as a sixth difference. Assuming that the fifth difference is equal to the sixth difference, the signal strength of the cell in the cell signal strength information of the indoor non-edge grid on the $k^{th}$ floor may be determined. Certainly, it may also be assumed that the fifth difference is unequal to the sixth difference, but they differ by an empirical value, so that the signal strength of the cell in the cell signal strength information of the indoor non-edge grid on the $k^{th}$ floor is determined.

Similarly, reference may be made to information about a cell in the emulated cell signal strength information or the cell signal strength information of the indoor edge grid that is on the $k^{th}$ floor and whose distance from the indoor non-edge grid on the $k^{th}$ floor is less than the third threshold, or reference may be made to information about a cell in the emulated cell signal strength information of the indoor non-edge grid on the $k^{th}$ floor, to complement a cell in the cell signal strength information of the indoor non-edge grid on the $k^{th}$ floor, which is not limited in this embodiment of the present invention. Moreover, the cell signal strength information of the indoor edge grid on the $k^{th}$ floor may be from indoor test data, or may be obtained through calculation according to an emulation algorithm or according to another embodiment of the present invention, which is not limited in this embodiment of the present invention.

Therefore, according to the method for determining cell signal strength information of an indoor non-edge grid provided in this embodiment of the present invention, an indoor edge grid that is on a $k^{th}$ floor and corresponding to an indoor non-edge grid on the $k^{th}$ floor is determined according to horizontal position information of the indoor non-edge grid on the $k^{th}$ floor, so that cell signal strength information of a non-edge grid on the $k^{th}$ floor can be obtained according to cell signal strength information of the indoor edge grid on the $k^{th}$ floor, so as to further implement high-accuracy 3D indoor positioning.

The foregoing describes in detail the method for obtaining cell signal strength information of an indoor grid on each floor of a building. Horizontal position information, height information, and cell signal strength information of a grid form 3D indoor positioning matching information, and multiple pieces of positioning matching information altogether may be referred to as a matching feature database. Steps of determining an indoor matching feature database of a building is described in the following from a more systematic perspective.

Vector contour information, height information, and the like of all buildings are extracted based on a 3D GIS. 3D modeling is performed on the building by using the information about the building extracted from the 3D GIS. Floor classification is performed for a 3D model of the building. Grid division is performed for each indoor floor of each building according to 3D GIS resolution or a multiple of resolution. Indoor emulation is performed for a floor of a building by using an emulation tool, and cell signal strength information of a grid corresponding to each floor can be obtained by means of emulation. In this way, an emulated matching feature database of a grid on a floor of the building is obtained, and emulated matching feature information of each grid includes information such as horizontal position information, height information and cell signal strength information of the grid that are obtained by means of emulation.

Figure 12:
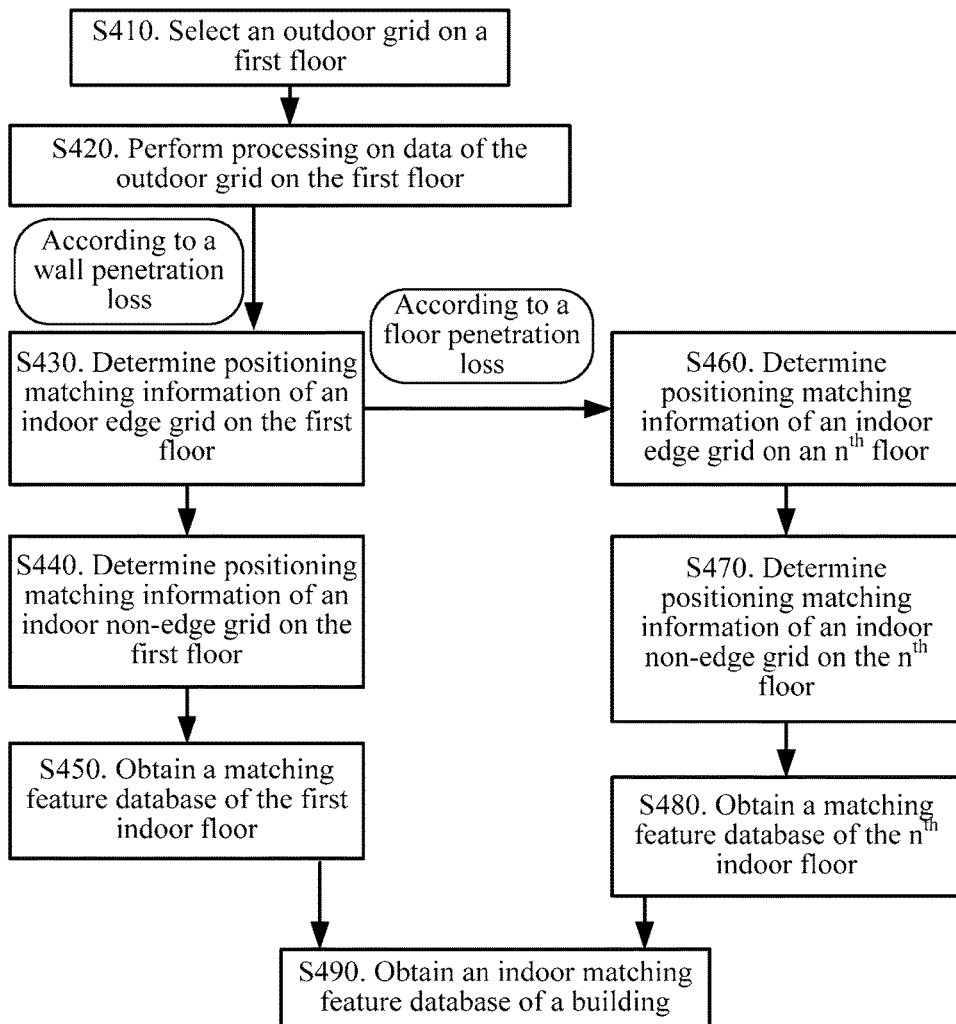
FIG. 12 is a schematic diagram of a method for determining an indoor matching feature database according to an embodiment of the present invention.

As an embodiment, for a lower floor of a building, a method 400 for determining an indoor matching feature database of a building is shown in FIG. 12. For a lower floor of a building, a variation of an indoor signal strength value is in conformity with a specific rule, and it is relatively easy and convenient by using this method. The method 400 may also be referred to as a "floor penetration loss determining method" according to main characteristics of the method 400. The method 400 includes:

S410. When an outdoor grid on a first floor is to be selected, an outdoor grid that is on the first floor and whose distance from an indoor edge grid on the first floor is 50 to 60 meters (there is basically no blocking from other buildings within this distance range; and an attenuation rule of DT data or terminal test data is relatively similar to that of data of an indoor grid, and with similar signal features and sufficient points, it is in conformity with statistic characteristics in mathematics) is selected to determine an indoor matching feature database.

S420. Perform processing on data of the outdoor grid on the first floor. Considering that a measurement value of a single outdoor grid on the first floor may have a great random error, smooth processing is performed on data of an outdoor grid on the first floor within a range of a first threshold (the first threshold may be a different value, and generally is 10 meters preferably, because a DT point or terminal test data within a range of 10 meters has relatively high feature relevance) surrounding any grid on the first floor, so as to obtain a relatively stable and accurate measurement value (averaging is performed on signal strength of same cells).

S430. For emulated matching feature information of the indoor edge grid on the first floor, only its horizontal position information is used, and an outdoor grid that is on the first floor and closest to a to-be-determined indoor edge grid on the first floor is determined from outdoor grids on the first floor. Signal strength of a same cell of the two is replaced with signal strength that is corresponding to the outdoor grid on the first floor and on which wall penetration loss correction has been performed. For a cell that exists only in an emulated matching feature database or data of the outdoor grid on the first floor, an antenna engineering parameter database is queried, so as to determine a proximity degree of the cell to an actual geographical position of a set of the same cell obtained in the foregoing. If a cell close to the set of the same cell exists, in a similar propagation environment, the cell should also be received by an indoor grid, and therefore, the cell is added to matching feature information of the indoor grid; otherwise, the cell is discarded.

S440. Determine matching feature information of an indoor non-edge grid on the first floor according to matching feature information of the indoor edge grid on the first floor, data of the outdoor grid on the first floor, and emulated matching feature information of the indoor non-edge grid on the first floor. A specific method is consistent with a principle and corresponding description shown in FIG. 5 in the foregoing, and details are not described herein again.

S450. After the matching feature information of the indoor edge grid on the first floor and the matching feature information of the indoor non-edge grid on the first floor are obtained according to the foregoing steps, a matching feature database corresponding to all indoor grids on the first floor may be obtained.

S460. Matching feature information of an indoor edge grid that is on an $n^{th}$ floor and located at a same horizontal position is determined by performing floor penetration loss on signal strength of a cell of the indoor edge grid on the first floor (the floor penetration loss may be a different value, and generally is 3 (n−1) dB preferably).

S470. Determine matching feature information of an indoor non-edge grid on the $n^{th}$ floor according to the matching feature information of the indoor edge grid on the $n^{th}$ floor and the data of the outdoor grid on the first floor. A specific method is consistent with corresponding description in the foregoing, and details are not described herein again.

S480. After the matching feature information of the indoor edge grid on the $n^{th}$ floor and the matching feature information of the indoor non-edge grid on the $n^{th}$ floor are obtained according to the foregoing steps, a matching feature database corresponding to all indoor grids on the $n^{th}$ floor may be obtained.

S490. Matching feature information of indoor grids on all floors may be obtained according to the foregoing steps, that is, the indoor matching feature database may be obtained.

Figure 13:
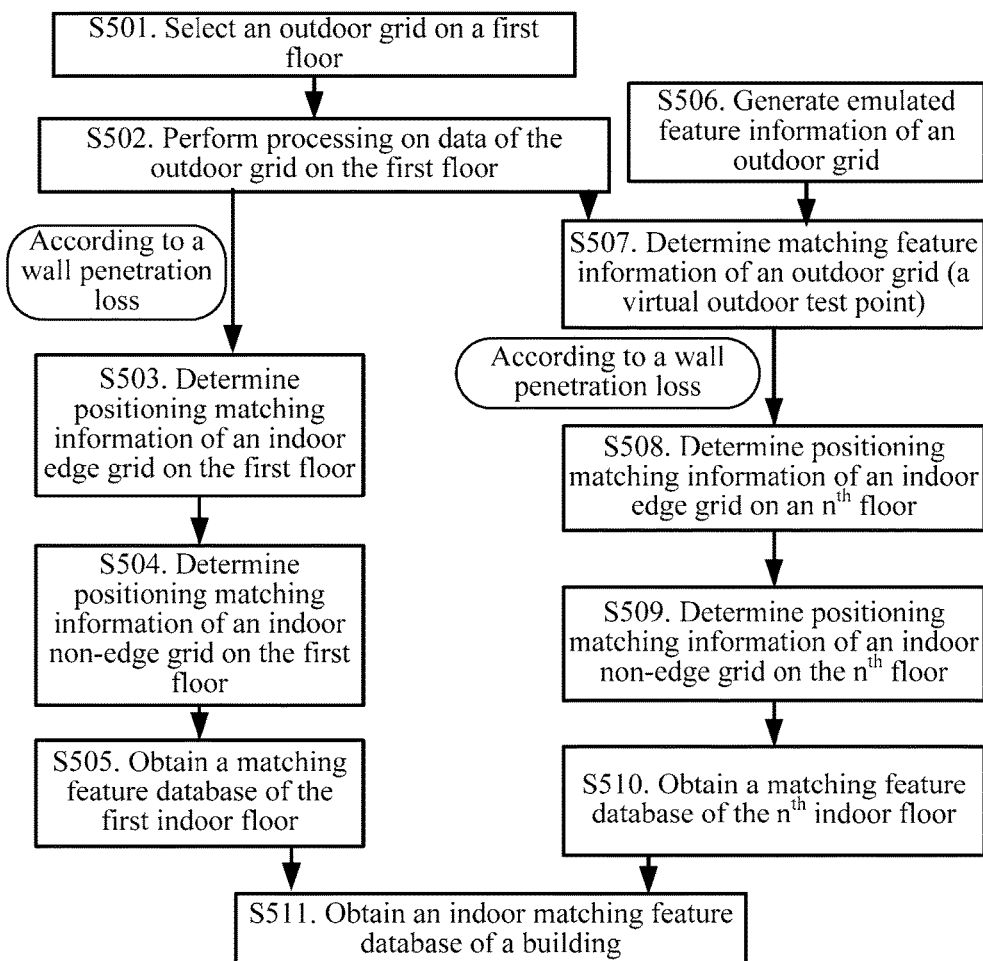
FIG. 13 is a schematic diagram of a method for determining an indoor matching feature database according to another embodiment of the present invention.

As another embodiment, for a higher floor of a building, a method 500 for determining an indoor matching feature database of a building is shown in FIG. 13. For a higher floor of a building, a variation trend of an indoor signal strength value is no longer stable due to a loss between floors, and it is more accurate by using this method. The method 500 may also be referred to as a "virtual outdoor test point determining method" according to main characteristics of the method 500. The method 500 includes:

A process of S501 to S505 for selecting an outdoor grid on a first floor and determining matching feature information of an indoor grid on the first floor is similar to a process of S410 to S450 in the method 400, and details are not described herein again.

S506. With reference to a height of each indoor floor, perform emulation, by means of ray tracing 3D emulation, for space that is in an exterior of the building and close to the building, to generate an emulated matching feature database, where a horizontal distance of an outdoor grid on each floor from an indoor grid on an $n^{th}$ floor is 50 to 60 meters.

S507. Determine matching feature information of the outdoor grid on each floor according to test data of the outdoor grid on the first floor and emulated matching feature information of each outdoor floor. A specific method is consistent with a principle and corresponding description shown in FIG. 7 or FIG. 8 in the foregoing, and details are not described herein again.

S508. Perform correction on matching feature information of an outdoor grid on the $n^{th}$ floor according to a wall penetration loss, so as to determine matching feature information of an indoor edge grid on the $n^{th}$ floor. A specific method is consistent with a principle and corresponding description in S430 for determining the matching feature information of the indoor edge grid on the first floor according to the matching feature information of the outdoor grid on the first floor, and details are not described herein again.

S509. Determine matching feature information of an indoor non-edge grid on the $n^{th}$ floor according to the matching feature information of the indoor edge grid on the $n^{th}$ floor, data of the outdoor grid on the $n^{th}$ floor, and emulated matching feature information of the indoor non-edge grid on the $n^{th}$ floor. A specific method is consistent with a principle and corresponding description in S440, and details are not described herein again.

S510. After the matching feature information of the indoor edge grid on the $n^{th}$ floor and the matching feature information of the indoor non-edge grid on the $n^{th}$ floor are obtained according to the foregoing steps, a matching feature database corresponding to all indoor grids on the $n^{th}$ floor may be obtained.

S511. Matching feature information of indoor grids on all floors may be obtained according to the foregoing steps, that is, the indoor matching feature database may be obtained.

Figure 14:
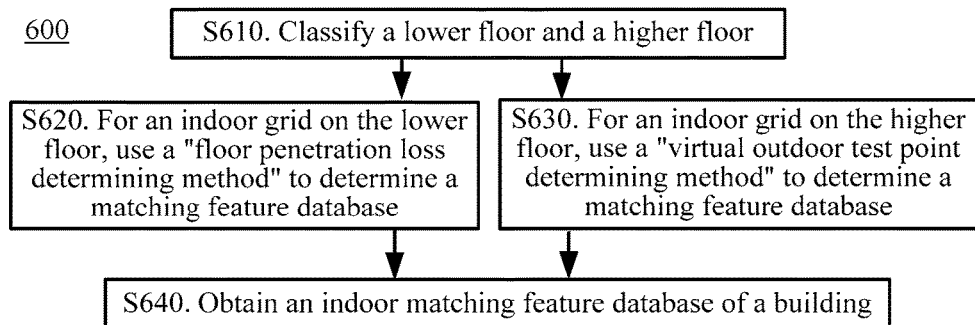
FIG. 14 is a schematic diagram of a method for determining an indoor matching feature database according to another embodiment of the present invention.

As still another embodiment, FIG. 14 shows a method 600 in which different methods are used separately to determine indoor matching feature information of a building for a lower floor and a higher floor of the building, so as to further improve accuracy of a matching feature database. The method 600 may also be referred to as a "mixed determining method" according to main characteristics of the method 600. The method 600 includes:

S610. Classify a lower floor and a higher floor. Floors are classified into a lower floor and a higher floor by setting a classification rule, for example, if n≤N, a floor n is a lower floor; and if n>N, a floor n is a higher floor (N may be a different value, and generally is 4 or 5).

S620. For the lower floor, use the "floor penetration loss determining method" to obtain a matching feature database of the floor.

S630. For the higher floor, use the "virtual outdoor test point determining method" to obtain a matching feature database of the floor.

S640. Combine matching feature databases, which are corrected separately by using the foregoing two methods, of the lower floor and the higher floor to form an overall indoor matching feature database of the building.

Figure 15:
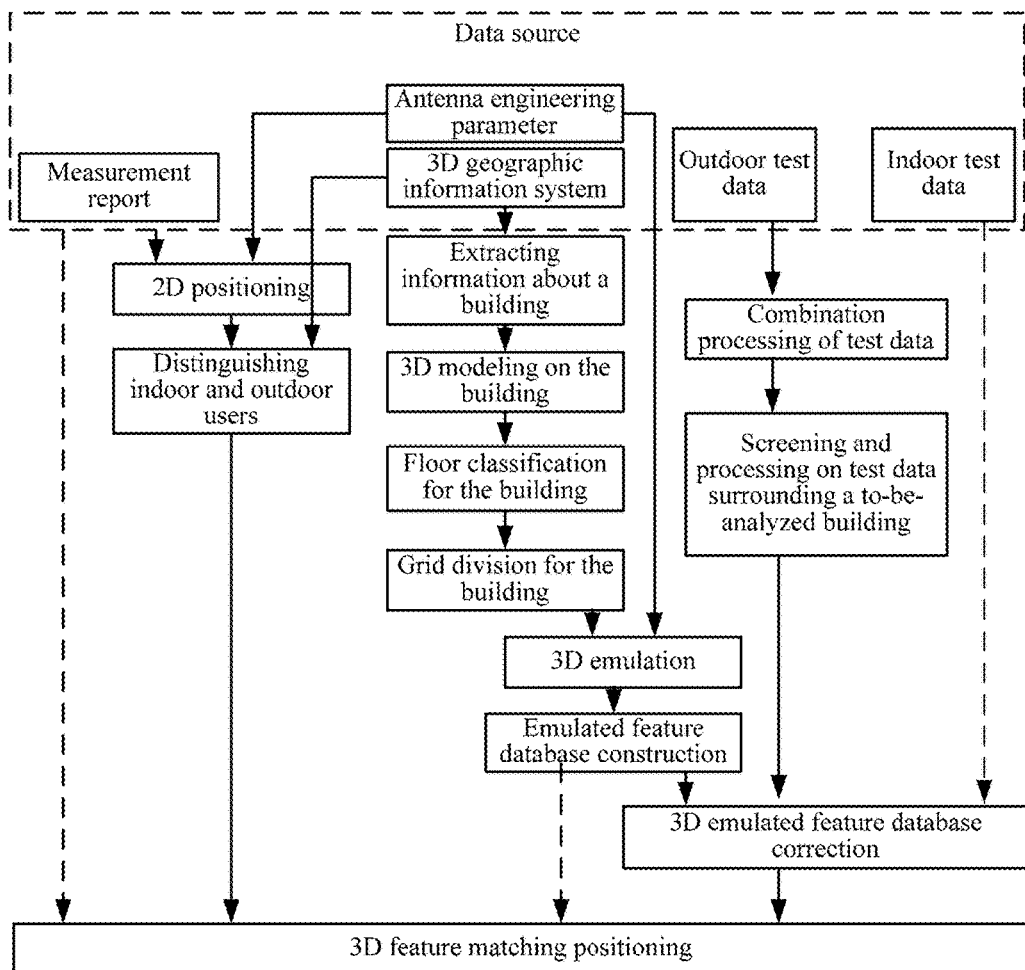
FIG. 15 is a schematic diagram of an indoor positioning method according to an embodiment of the present invention.

Comprehensive description of establishment of an entire matching feature database and a process of 3D feature matching positioning is made in the following by using a specific example. As shown in FIG. 15, information about a building is extracted from a 3D GIS; 3D modeling is performed on the building; floor classification is performed for the building according to the information about the building and grid division is performed for each floor; and then, 3D emulation is performed for the building with reference to an engineering parameter of an antenna. Hereto, a 3D emulated matching feature database may be constructed, and the data may be directly used as data of a 3D matching feature database for final 3D feature matching positioning.

Outdoor test data is acquired; combination processing is performed on the outdoor test data; and then, screening and corresponding processing are performed on test data surrounding the building. The test data is used to perform correction on information in the 3D emulated feature database, and indoor test data may further be used to perform correction on the information in the 3D emulated feature database to form a 3D matching feature database for 3D matching feature positioning.

When 3D positioning is performed, a measurement report may be acquired directly from a to-be-positioned terminal, and by matching information in the measurement report with a 3D matching feature database, a horizontal position and a height of the terminal are determined; or it may be that according to the measurement report of the terminal, 2D positioning is first performed on the terminal with reference to an engineering parameter of an antenna, according to a result of the positioning, indoor and outdoor users are distinguished with reference to 3D GIS information, and after it is determined that the terminal is located indoors, accurate positioning is performed on the terminal according to an indoor 3D matching feature database.

It should be understood that sequence numbers of the processes do not mean execution sequences in various embodiments of the present invention. The execution sequences of the processes should be determined according to functions and internal logic of the processes, and should not be construed as any limitation on the implementation processes of the embodiments of the present invention.

Figure 16:
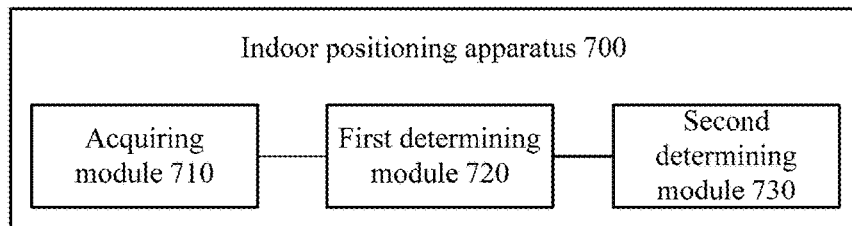
FIG. 16 is a schematic block diagram of an indoor positioning apparatus according to an embodiment of the present invention.
Figure 17:
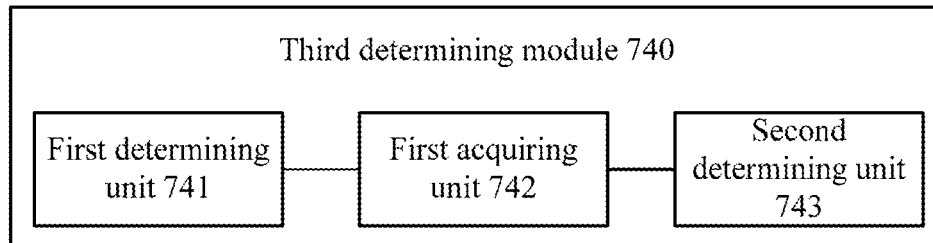
FIG. 17 is a schematic block diagram of a third determining module according to an embodiment of the present invention.
Figure 18:
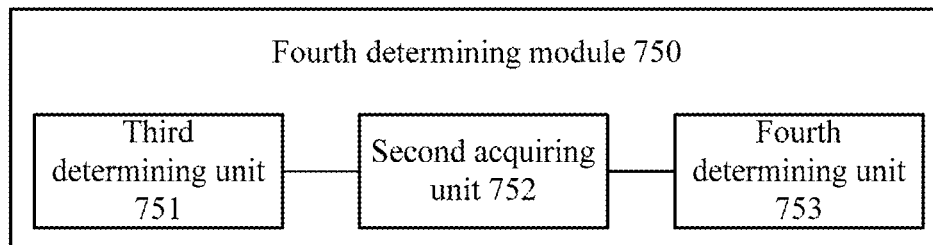
FIG. 18 is a schematic block diagram of a fourth determining module according to an embodiment of the present invention.

With reference to FIG. 1 to FIG. 15, the indoor positioning method according to the embodiment of the present invention is described in detail in the foregoing. With reference to FIG. 16 to FIG. 18, an indoor positioning apparatus according to an embodiment of the present invention is described in detail in the following.

FIG. 16 is a schematic block diagram of an indoor positioning apparatus 700 according to an embodiment of the present invention. As shown in FIG. 16, the indoor positioning apparatus 700 includes:

an acquiring module 710, configured to acquire current cell signal strength information of a terminal located indoors;

a first determining module 720, configured to determine, according to three-dimensional (3D) indoor positioning matching information, horizontal position information and height information of an indoor grid that are corresponding to the current cell signal strength information acquired by the acquiring module 710, where the 3D indoor positioning matching information includes a correspondence between cell signal strength information of the indoor grid and the horizontal position information and the height information of the indoor grid; and a second determining module 730, configured to determine, according to the horizontal position information and the height information of the indoor grid that are corresponding to the current cell signal strength information and determined by the first determining module 720, a horizontal position at which the terminal is located indoors and a height at which the terminal is located, where the horizontal position information includes position information in a first direction and a second direction, and the first direction and the second direction are two mutually perpendicular directions in a horizontal plane.

Therefore, according to the indoor positioning apparatus provided in this embodiment of the present invention, current cell signal strength information of a to-be-positioned terminal located indoors is matched with cell signal strength information in three-dimensional (3D) indoor positioning matching information to determine horizontal position information and height information of a corresponding indoor grid, so as to determine a horizontal position at which the terminal is located indoors and a height at which the terminal is located. In this way, high-accuracy 3D indoor positioning is implemented.

Optionally, as an embodiment, as shown in FIG. 17, the indoor positioning apparatus 700 may further include a third determining module 740 that is configured to determine the cell signal strength information of the indoor grid; and the third determining module 740 includes:

a first determining unit 741, configured to determine, according to horizontal position information of an indoor grid on an $n^{th}$ floor, an outdoor grid that is on the $n^{th}$ floor and corresponding to the indoor grid on the $n^{th}$ floor, where n is an integer greater than or equal to 1;

a first acquiring unit 742, configured to acquire cell signal strength information of the outdoor grid that is on the $n^{th}$ floor, corresponding to the indoor grid on the $n^{th}$ floor, and determined by the first determining unit 741; and a second determining unit 743, configured to determine cell signal strength information of the indoor grid on the $n^{th}$ floor according to the cell signal strength information, which is acquired by the first acquiring unit 742, of the outdoor grid that is on the $n^{th}$ floor and corresponding to the indoor grid on the $n^{th}$ floor.

Optionally, when the indoor grid on the $n^{th}$ floor is an indoor edge grid on the $n^{th}$ floor, the first determining unit 741 is specifically configured to:

determine, according to horizontal position information of the indoor edge grid on the $n^{th}$ floor, an outdoor grid that is on the $n^{th}$ floor and whose distance from the indoor edge grid on the $n^{th}$ floor is less than a first threshold, where the distance is obtained through calculation according to horizontal position information of the grids; and the second determining unit 743 is specifically configured to:

determine cell signal strength information of the indoor edge grid on the $n^{th}$ floor according to cell signal strength information of the outdoor grid that is on the $n^{th}$ floor and whose distance from the indoor edge grid on the $n^{th}$ floor is less than the first threshold and according to a loss relationship between indoor signal strength and outdoor signal strength.

Optionally, when the indoor grid on the $n^{th}$ floor is an indoor non-edge grid on the $n^{th}$ floor, the first determining unit 741 is specifically configured to:

determine an indoor edge grid that is on the $n^{th}$ floor in any direction of the horizontal position information and corresponding to the indoor non-edge grid on the $n^{th}$ floor; and determine a first outdoor grid and a second outdoor grid, where both the first outdoor grid and the second outdoor grid are outdoor grids on the $n^{th}$ floor, a relative position relationship between the first outdoor grid and the second outdoor grid is consistent with a relative position relationship between the indoor non-edge grid on the $n^{th}$ floor and the indoor edge grid that is on the $n^{th}$ floor and corresponding to the indoor non-edge grid on the $n^{th}$ floor, environmental relevance of the first outdoor grid is consistent with environmental relevance of the indoor edge grid that is on the $n^{th}$ floor and corresponding to the indoor non-edge grid on the $n^{th}$ floor, the relative position relationship between the first outdoor grid and the second outdoor grid is obtained through calculation according to horizontal position information of the first outdoor grid and horizontal position information of the second outdoor grid, and the relative position relationship between the indoor non-edge grid on the $n^{th}$ floor and the indoor edge grid that is on the $n^{th}$ floor and corresponding to the indoor non-edge grid on the $n^{th}$ floor is obtained through calculation according to horizontal position information of the indoor non-edge grid on the $n^{th}$ floor and horizontal position information of the indoor edge grid that is on the $n^{th}$ floor and corresponding to the indoor non-edge grid on the $n^{th}$ floor; and the second determining unit 743 is specifically configured to:

determine cell signal strength information of the indoor non-edge grid on the $n^{th}$ floor according to cell signal strength information of the first outdoor grid, cell signal strength information of the second outdoor grid, and cell signal strength information of the indoor edge grid that is on the $n^{th}$ floor and corresponding to the indoor non-edge grid on the $n^{th}$ floor.

The environmental relevance of the first outdoor grid includes a relative position relationship between the first outdoor grid and an antenna of a base station, and the environmental relevance of the indoor edge grid that is on the $n^{th}$ floor and corresponding to the indoor non-edge grid on the $n^{th}$ floor includes a relative position relationship between the antenna of the base station and the indoor edge grid that is on the $n^{th}$ floor and corresponding to the indoor non-edge grid on the $n^{th}$ floor.

The relative position relationship between the first outdoor grid and the antenna of the base station is obtained through calculation according to the horizontal position information and height information of the first outdoor grid and horizontal position information and height information of the antenna of the base station; and the relative position relationship between the antenna of the base station and the indoor edge grid that is on the $n^{th}$ floor and corresponding to the indoor non-edge grid on the $n^{th}$ floor is obtained through calculation according to the horizontal position information and the height information of the antenna of the base station and the horizontal position information and height information of the indoor edge grid that is on the $n^{th}$ floor and corresponding to the indoor non-edge grid on the $n^{th}$ floor.

Optionally, when n is greater than 1, the first acquiring unit 742 is specifically configured to:

determine, through emulation calculation and according to engineering parameter information of the antenna of the base station, emulated cell signal strength information of the outdoor grid that is on the $n^{th}$ floor and corresponding to the indoor grid on the $n^{th}$ floor and emulated cell signal strength information of an outdoor grid on a first floor, where horizontal position information of the outdoor grid on the first floor is consistent with horizontal position information of the outdoor grid that is on the $n^{th}$ floor and corresponding to the indoor grid on the $n^{th}$ floor; and determine, according to the emulated cell signal strength information of the outdoor grid that is on the $n^{th}$ floor and corresponding to the indoor grid on the $n^{th}$ floor, the emulated cell signal strength information of the outdoor grid on the first floor, and cell signal strength information of the outdoor grid on the first floor, the cell signal strength information of the outdoor grid that is on the $n^{th}$ floor and corresponding to the indoor grid on the $n^{th}$ floor.

Optionally, when n is greater than 1, the first acquiring unit 742 is specifically configured to:

determine, through emulation calculation and according to engineering parameter information of the antenna of the base station, emulated cell signal strength information of an outdoor grid on an $(n-1)^{th}$ floor and emulated cell signal strength information of the outdoor grid on the $n^{th}$ floor, where position information in the first direction and the second direction of both the outdoor grid on the $(n-1)^{th}$ floor and the outdoor grid on the $n^{th}$ floor is consistent with position information in the first direction and the second direction of the outdoor grid that is on the $(n-1)^{th}$ floor and corresponding to the indoor grid on the $(n-1)^{th}$ floor; a height of the outdoor grid on the $(n-1)^{th}$ floor is equal to a height of the indoor grid on the $(n-1)^{th}$ floor; and a height of the outdoor grid on the $n^{th}$ floor is equal to a height of the indoor grid on the $n^{th}$ floor;

determine cell signal strength information of the outdoor grid on the $(n-1)^{th}$ floor; and determine the cell signal strength information of the outdoor grid on the $n^{th}$ floor according to the emulated cell signal strength information of the outdoor grid on the $(n-1)^{th}$ floor, the emulated cell signal strength information of the outdoor grid on the $n^{th}$ floor, and the cell signal strength information of the outdoor grid on the $(n-1)^{th}$ floor.

Optionally, when n is equal to 1, the first acquiring unit 742 is specifically configured to:

acquire test data of an outdoor grid that is on a first floor and corresponding to an indoor grid on the first floor, where the test data includes horizontal position information and cell signal strength information of the outdoor grid that is on the first floor and corresponding to the indoor grid on the first floor;

delete error data from the test data according to a variation rule that cell signal strength is attenuated with a distance, where the variation rule that cell signal strength is attenuated with a distance is obtained according to cell signal strength information of multiple outdoor grids on the first floor and horizontal position information of the multiple outdoor grids on the first floor; and determine that cell signal strength information in the test data from which the error data is deleted is the cell signal strength information of the outdoor grid that is on the first floor and corresponding to the indoor grid on the first floor.

Optionally, after the first acquiring unit 742 deletes the error data from the test data according to the variation rule that cell signal strength is attenuated with a distance, the first acquiring unit 742 is further configured to:

perform, according to cell signal strength information of multiple outdoor grids that are on the first floor and whose distance from the outdoor grid that is on the first floor and corresponding to the indoor grid on the first floor is less than a second threshold, smooth processing on the cell signal strength information in the test data from which the error data is deleted; and the first acquiring unit 742 determines that the cell signal strength information in the test data from which the error data is deleted is the cell signal strength information of the outdoor grid that is on the first floor and corresponding to the indoor grid on the first floor, which includes:

determining that the smooth-processed cell signal strength information in the test data from which the error data is deleted is the cell signal strength information of the outdoor grid that is on the first floor and corresponding to the indoor grid on the first floor.

Therefore, according to the module for determining cell signal strength information of an indoor grid provided in this embodiment of the present invention, an outdoor grid that is on an $n^{th}$ floor and corresponding to an indoor grid on the $n^{th}$ floor is determined according to horizontal position information of the indoor grid on the $n^{th}$ floor; and cell signal strength information of the indoor grid on the $n^{th}$ floor may be determined according to the acquired cell signal strength information of the corresponding outdoor grid on the $n^{th}$ floor, so that high-accuracy indoor cell signal strength information can be obtained and the indoor positioning apparatus further implements high-accuracy 3D indoor positioning.

Optionally, as another embodiment, as shown in FIG. 18, the indoor positioning apparatus 700 may further include a fourth determining module 750 that is configured to determine the cell signal strength information of the indoor grid; and the fourth determining module 750 includes:

a third determining unit 751, configured to determine, according to horizontal position information of an indoor grid on a $p^{th}$ floor, an indoor grid that is on an $m^{th}$ floor and corresponding to the indoor grid on the $p^{th}$ floor or an outdoor grid that is on an $m^{th}$ floor and corresponding to the indoor grid on the $p^{th}$ floor;

a second acquiring unit 752, configured to acquire cell signal strength information of the indoor grid that is on the $m^{th}$ floor, corresponding to the indoor grid on the $p^{th}$ floor, and determined by the third determining unit 751 or cell signal strength information of the outdoor grid that is on the $m^{th}$ floor, corresponding to the indoor grid on the $p^{th}$ floor, and determined by the third determining unit 751; and a fourth determining unit 753, configured to determine cell signal strength information of the indoor grid on the $p^{th}$ floor according to the cell signal strength information, which is acquired by the second acquiring unit 752, of the indoor grid that is on the $m^{th}$ floor and corresponding to the indoor grid on the $p^{th}$ floor or the outdoor grid that is on the $m^{th}$ floor and corresponding to the indoor grid on the $p^{th}$ floor, where p is an integer greater than 1, m is a positive integer less than p, a height of the first floor is a ground level, and a height of the $p^{th}$ floor is higher than the ground level.

Optionally, when the indoor grid on the $p^{th}$ floor is an indoor edge grid on the $p^{th}$ floor, the third determining unit 751 is specifically configured to:

determine an indoor edge grid that is on the first floor and corresponding to the indoor edge grid on the $p^{th}$ floor, where horizontal position information of the indoor edge grid that is on the first floor and corresponding to the indoor edge grid on the $p^{th}$ floor is consistent with the horizontal position information of the indoor grid on the $p^{th}$ floor; and the fourth determining unit 753 is specifically configured to:

determine cell signal strength information of the indoor edge grid on the $p^{th}$ floor according to cell signal strength information of the indoor edge grid that is on the first floor and corresponding to the indoor edge grid on the $p^{th}$ floor and according to a loss relationship of signal strength between floors.

Optionally, when the indoor grid on the $p^{th}$ floor is an indoor non-edge grid on the $p^{th}$ floor, the third determining unit 751 is specifically configured to:

determine an indoor edge grid that is on the $p^{th}$ floor in any direction of the horizontal position information and corresponding to the indoor non-edge grid on the $p^{th}$ floor; and determine a first outdoor grid and a second outdoor grid, where both the first outdoor grid and the second outdoor grid are outdoor grids on the first floor, a relative position relationship between the first outdoor grid and the second outdoor grid is consistent with a relative position relationship between the indoor non-edge grid on the $p^{th}$ floor and the indoor edge grid that is on the $p^{th}$ floor and corresponding to the indoor non-edge grid on the $p^{th}$ floor, environmental relevance of the first outdoor grid is consistent with environmental relevance of the indoor edge grid that is on the $p^{th}$ floor and corresponding to the indoor non-edge grid on the $p^{th}$ floor, the relative position relationship between the first outdoor grid and the second outdoor grid is obtained through calculation according to horizontal position information of the first outdoor grid and horizontal position information of the second outdoor grid, and the relative position relationship between the indoor non-edge grid on the $p^{th}$ floor and the indoor edge grid that is on the $p^{th}$ floor and corresponding to the indoor non-edge grid on the $p^{th}$ floor is obtained through calculation according to horizontal position information of the indoor non-edge grid on the $p^{th}$ floor and horizontal position information of the indoor edge grid that is on the $p^{th}$ floor and corresponding to the indoor non-edge grid on the $p^{th}$ floor; and the fourth determining unit 753 is specifically configured to:

determine cell signal strength information of the indoor non-edge grid on the $p^{th}$ floor according to cell signal strength information of the first outdoor grid, cell signal strength information of the second outdoor grid, and cell signal strength information of the indoor edge grid that is on the $p^{th}$ floor and corresponding to the indoor non-edge grid on the $p^{th}$ floor.

The environmental relevance of the first outdoor grid includes a relative position relationship between the first outdoor grid and an antenna of a base station, and the environmental relevance of the indoor edge grid that is on the $p^{th}$ floor and corresponding to the indoor non-edge grid on the $p^{th}$ floor includes a relative position relationship between the antenna of the base station and the indoor edge grid that is on the $p^{th}$ floor and corresponding to the indoor non-edge grid on the $p^{th}$ floor.

The relative position relationship between the first outdoor grid and the antenna of the base station is obtained through calculation according to the horizontal position information and height information of the first outdoor grid and horizontal position information and height information of the antenna of the base station; and the relative position relationship between the antenna of the base station and the indoor edge grid that is on the $p^{th}$ floor and corresponding to the indoor non-edge grid on the $p^{th}$ floor is obtained through calculation according to the horizontal position information and the height information of the antenna of the base station and the horizontal position information and height information of the indoor edge grid that is on the $p^{th}$ floor and corresponding to the indoor non-edge grid on the $p^{th}$ floor.

Preferably, m is equal to 1, that is, the fourth determining module 750 determines the cell signal strength information of the indoor grid on the $p^{th}$ floor according to the cell signal strength information of the indoor grid that is on the first floor and corresponding to the indoor grid on the $p^{th}$ floor or the cell signal strength information of the outdoor grid that is on the first floor and corresponding to the indoor grid on the $p^{th}$ floor.

Optionally, as still another embodiment, the apparatus 700 may further include a fifth determining module that is configured to determine cell signal strength information of a non-edge grid in the indoor grid; and the fifth determining module includes:

a fifth determining unit, configured to determine, according to horizontal position information of an indoor non-edge grid on a $k^{th}$ floor, an indoor edge grid that is on the $k^{th}$ floor and whose distance from the indoor non-edge grid on the $k^{th}$ floor is less than a third threshold, where the distance is obtained through calculation according to horizontal position information of the grids, and k is an integer greater than or equal to 1;

a third acquiring unit, configured to acquire cell signal strength information of the indoor edge grid that is on the $k^{th}$ floor and determined by the fifth determining unit and whose distance from the indoor non-edge grid on the $k^{th}$ floor is less than the third threshold;

a sixth determining unit, configured to determine, through emulation calculation and according to engineering parameter information of an antenna of a base station, emulated cell signal strength information of the indoor edge grid that is on the $k^{th}$ floor and whose distance from the indoor non-edge grid on the $k^{th}$ floor is less than the third threshold and emulated cell signal strength information of the indoor non-edge grid on the $k^{th}$ floor; and a seventh determining unit, configured to determine cell signal strength information of the indoor non-edge grid on the $k^{th}$ floor according to the emulated cell signal strength information, which is determined by the sixth determining unit, of the indoor edge grid that is on the $k^{th}$ floor and whose distance from the indoor non-edge grid on the $k^{th}$ floor is less than the third threshold, the emulated cell signal strength information, which is determined by the sixth determining unit, of the indoor non-edge grid on the $k^{th}$ floor, and the cell signal strength information, which is acquired by the third acquiring unit, of the indoor edge grid that is on the $k^{th}$ floor and whose distance from the indoor non-edge grid on the $k^{th}$ floor is less than the third threshold.

Therefore, according to the module for determining cell signal strength information of an indoor grid provided in this embodiment of the present invention, an outdoor grid that is on a first floor and corresponding to an indoor grid on an $n^{th}$ floor or an indoor grid that is on a first floor and corresponding to an indoor grid on an $n^{th}$ floor is determined according to horizontal position information of the indoor grid on the $n^{th}$ floor; and cell signal strength information of the indoor grid on the $n^{th}$ floor may be determined according to the acquired cell signal strength information of the corresponding outdoor grid or indoor grid on the first floor, so that high-accuracy indoor cell signal strength information can be obtained and the indoor positioning apparatus further implements high-accuracy 3D indoor positioning.

It should be understood that in this embodiment of the present invention, the indoor positioning apparatus 700 according to this embodiment of the present invention may be corresponding to an executor of a method according to the embodiment of the present invention, and the foregoing and other operations and/or functions of the modules in the indoor positioning apparatus 700 are used to implement corresponding procedures of the methods in FIG. 1 to FIG. 15. For brevity, details are not described herein again.

Therefore, according to the indoor positioning apparatus provided in this embodiment of the present invention, current cell signal strength information of a to-be-positioned terminal located indoors is matched with cell signal strength information in three-dimensional (3D) indoor positioning matching information to determine horizontal position information and height information of a corresponding indoor grid, so as to determine a horizontal position at which the terminal is located indoors and a height at which the terminal is located. In this way, high-accuracy 3D indoor positioning can be implemented.

Figure 19:
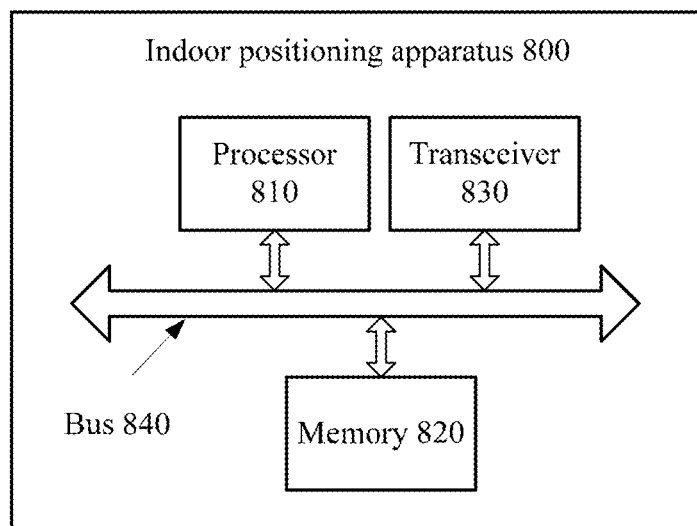
FIG. 19 is a schematic block diagram of an indoor positioning apparatus according to another embodiment of the present invention.

As shown in FIG. 19, an embodiment of the present invention further provides an indoor positioning apparatus 800, where the apparatus 800 includes a processor 810, a memory 820, a transceiver 830, and a bus apparatus 840; the processor 810, the memory 820, and the transceiver 830 are connected by using the bus apparatus 840; the memory 820 is configured to store an instruction; and the processor 810 is configured to execute the instruction stored in the memory 820; where the transceiver 830 is configured to:

acquire current cell signal strength information of a terminal located indoors.

The processor 810 is configured to:

determine, according to three-dimensional (3D) indoor positioning matching information, horizontal position information and height information of an indoor grid that are corresponding to the current cell signal strength information, where the 3D indoor positioning matching information includes a correspondence between cell signal strength information of the indoor grid and the horizontal position information and the height information of the indoor grid; and determine, according to the horizontal position information and the height information of the indoor grid that are corresponding to the current cell signal strength information, a horizontal position at which the terminal is located indoors and a height at which the terminal is located, where the horizontal position information includes position information in a first direction and a second direction, and the first direction and the second direction are two mutually perpendicular directions in a horizontal plane.

Therefore, according to the indoor positioning apparatus provided in this embodiment of the present invention, current cell signal strength information of a to-be-positioned terminal located indoors is matched with cell signal strength information in three-dimensional (3D) indoor positioning matching information to determine a corresponding indoor grid and horizontal position information and height information of the indoor grid, so as to determine a horizontal position at which the terminal is located indoors and a height at which the terminal is located. In this way, high-accuracy 3D indoor positioning can be implemented.

It should be understood that in this embodiment of the present invention, the processor 810 may be a central processing unit (Central Processing Unit, CPU), or the processor 810 may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor or the processor may be any conventional processor, or the like.

The memory 820 may include a read-only memory and a random access memory, and provides an instruction and data for the processor 1010. The memory 820 may further include a nonvolatile random access memory. For example, the memory 820 may further store information about a device type.

In addition to a data bus, the bus system 840 may further include a power bus, a control bus, a status signal bus, and the like. However, for clarity of description, various buses are marked as the bus system 840 in the figure.

In an implementation process, the steps in the foregoing methods may be completed by means of an integrated logic circuit of hardware in the processor 810 or an instruction in the form of software. The steps of the methods disclosed with reference to the embodiments of the present invention may be directly executed and accomplished by means of a hardware processor, or may be executed and accomplished by using a combination of hardware and software modules in a processor. The software module may be located in a mature storage medium in the field, such as a random access memory, a flash memory, a read-only memory, a programmable read-only memory, an electrically-erasable programmable memory or a register. The storage medium is located in the memory 820. The processor 810 reads information from the memory 820, and completes the steps of the foregoing methods in combination with the hardware. To avoid repetition, details are not described herein again.

Optionally, as an embodiment, the processor 810 is further configured to determine the cell signal strength information of the indoor grid, and is specifically configured to execute the following steps:

determining, according to horizontal position information of an indoor grid on an $n^{th}$ floor, an outdoor grid that is on the $n^{th}$ floor and corresponding to the indoor grid on the $n^{th}$ floor, where n is an integer greater than or equal to 1;

acquiring cell signal strength information of the outdoor grid that is on the $n^{th}$ floor and corresponding to the indoor grid on the $n^{th}$ floor; and determining cell signal strength information of the indoor grid on the $n^{th}$ floor according to the cell signal strength information of the outdoor grid that is on the $n^{th}$ floor and corresponding to the indoor grid on the $n^{th}$ floor.

Optionally, when the indoor grid on the $n^{th}$ floor is an indoor edge grid on the $n^{th}$ floor, the processor 810 determines, according to the horizontal position information of the indoor grid on the $n^{th}$ floor, the outdoor grid that is on the $n^{th}$ floor and corresponding to the indoor grid on the $n^{th}$ floor, which may include:

determining, according to horizontal position information of the indoor edge grid on the $n^{th}$ floor, an outdoor grid that is on the $n^{th}$ floor and whose distance from the indoor edge grid on the $n^{th}$ floor is less than a first threshold, where the distance is obtained through calculation according to horizontal position information of the grids; and the processor 810 determines the cell signal strength information of the indoor grid on the $n^{th}$ floor according to the cell signal strength information of the outdoor grid that is on the $n^{th}$ floor and corresponding to the indoor grid on the $n^{th}$ floor, which may include:

determining cell signal strength information of the indoor edge grid on the $n^{th}$ floor according to cell signal strength information of the outdoor grid that is on the $n^{th}$ floor and whose distance from the indoor edge grid on the $n^{th}$ floor is less than the first threshold and according to a loss relationship between indoor signal strength and outdoor signal strength.

Optionally, when the indoor grid on the $n^{th}$ floor is an indoor non-edge grid on the $n^{th}$ floor, the processor 810 determines, according to the horizontal position information of the indoor grid on the $n^{th}$ floor, the outdoor grid that is on the $n^{th}$ floor and corresponding to the indoor grid on the $n^{th}$ floor, which may include:

determining an indoor edge grid that is on the $n^{th}$ floor in any direction of the horizontal position information and corresponding to the indoor non-edge grid on the $n^{th}$ floor; and determining a first outdoor grid and a second outdoor grid, where both the first outdoor grid and the second outdoor grid are outdoor grids on the $n^{th}$ floor, a relative position relationship between the first outdoor grid and the second outdoor grid is consistent with a relative position relationship between the indoor non-edge grid on the $n^{th}$ floor and the indoor edge grid that is on the $n^{th}$ floor and corresponding to the indoor non-edge grid on the $n^{th}$ floor, environmental relevance of the first outdoor grid is consistent with environmental relevance of the indoor edge grid that is on the $n^{th}$ floor and corresponding to the indoor non-edge grid on the $n^{th}$ floor, the relative position relationship between the first outdoor grid and the second outdoor grid is obtained through calculation according to horizontal position information of the first outdoor grid and horizontal position information of the second outdoor grid, and the relative position relationship between the indoor non-edge grid on the $n^{th}$ floor and the indoor edge grid that is on the $n^{th}$ floor and corresponding to the indoor non-edge grid on the $n^{th}$ floor is obtained through calculation according to horizontal position information of the indoor non-edge grid on the $n^{th}$ floor and horizontal position information of the indoor edge grid that is on the $n^{th}$ floor and corresponding to the indoor non-edge grid on the $n^{th}$ floor; and the processor 810 determines the cell signal strength information of the indoor grid on the $n^{th}$ floor according to the cell signal strength information of the outdoor grid that is on the $n^{th}$ floor and corresponding to the indoor grid on the $n^{th}$ floor, which may include:

determining cell signal strength information of the indoor non-edge grid on the $n^{th}$ floor according to cell signal strength information of the first outdoor grid, cell signal strength information of the second outdoor grid, and cell signal strength information of the indoor edge grid that is on the $n^{th}$ floor and corresponding to the indoor non-edge grid on the $n^{th}$ floor.

Optionally, the environmental relevance of the first outdoor grid includes a relative position relationship between the first outdoor grid and an antenna of a base station, and the environmental relevance of the indoor edge grid that is on the $n^{th}$ floor and corresponding to the indoor non-edge grid on the $n^{th}$ floor includes a relative position relationship between the antenna of the base station and the indoor edge grid that is on the $n^{th}$ floor and corresponding to the indoor non-edge grid on the $n^{th}$ floor.

Optionally, the relative position relationship between the first outdoor grid and the antenna of the base station is obtained through calculation according to the horizontal position information and height information of the first outdoor grid and horizontal position information and height information of the antenna of the base station; and the relative position relationship between the antenna of the base station and the indoor edge grid that is on the $n^{th}$ floor and corresponding to the indoor non-edge grid on the $n^{th}$ floor is obtained through calculation according to the horizontal position information and the height information of the antenna of the base station and the horizontal position information and height information of the indoor edge grid that is on the $n^{th}$ floor and corresponding to the indoor non-edge grid on the $n^{th}$ floor.

Optionally, when n is greater than 1, the processor 810 acquires the cell signal strength information of the outdoor grid that is on the $n^{th}$ floor and corresponding to the indoor grid on the $n^{th}$ floor, which may include:

determining, through emulation calculation and according to engineering parameter information of the antenna of the base station, emulated cell signal strength information of the outdoor grid that is on the $n^{th}$ floor and corresponding to the indoor grid on the $n^{th}$ floor and emulated cell signal strength information of an outdoor grid on a first floor, where horizontal position information of the outdoor grid on the first floor is consistent with horizontal position information of the outdoor grid that is on the $n^{th}$ floor and corresponding to the indoor grid on the $n^{th}$ floor; and determining, according to the emulated cell signal strength information of the outdoor grid that is on the $n^{th}$ floor and corresponding to the indoor grid on the $n^{th}$ floor, the emulated cell signal strength information of the outdoor grid on the first floor, and cell signal strength information of the outdoor grid on the first floor, the cell signal strength information of the outdoor grid that is on the $n^{th}$ floor and corresponding to the indoor grid on the $n^{th}$ floor.

Optionally, when n is greater than 1, the processor 810 acquires the cell signal strength information of the outdoor grid that is on the $n^{th}$ floor and corresponding to the indoor grid on the $n^{th}$ floor, which may include:

determining, through emulation calculation and according to engineering parameter information of the antenna of the base station, emulated cell signal strength information of an outdoor grid on an $(n-1)^{th}$ floor and emulated cell signal strength information of the outdoor grid on the $n^{th}$ floor, where position information in the first direction and the second direction of both the outdoor grid on the $(n-1)^{th}$ floor and the outdoor grid on the $n^{th}$ floor is consistent with position information in the first direction and the second direction of the outdoor grid that is on the $(n-1)^{th}$ floor and corresponding to the indoor grid on the $(n-1)^{th}$ floor; a height of the outdoor grid on the $(n-1)^{th}$ floor is equal to a height of the indoor grid on the $(n-1)^{th}$ floor; and a height of the outdoor grid on the $n^{th}$ floor is equal to a height of the indoor grid on the $n^{th}$ floor;

determining cell signal strength information of the outdoor grid on the $(n-1)^{th}$ floor; and determining the cell signal strength information of the outdoor grid on the $n^{th}$ floor according to the emulated cell signal strength information of the outdoor grid on the $(n-1)^{th}$ floor, the emulated cell signal strength information of the outdoor grid on the $n^{th}$ floor, and the cell signal strength information of the outdoor grid on the $(n-1)^{th}$ floor.

Optionally, when n is equal to 1, the processor 810 acquires the cell signal strength information of the outdoor grid that is on the $n^{th}$ floor and corresponding to the indoor grid on the $n^{th}$ floor, which may include:

acquiring test data of an outdoor grid that is on a first floor and corresponding to an indoor grid on the first floor, where the test data includes horizontal position information and cell signal strength information of the outdoor grid that is on the first floor and corresponding to the indoor grid on the first floor;

deleting error data from the test data according to a variation rule that cell signal strength is attenuated with a distance, where the variation rule that cell signal strength is attenuated with a distance is obtained according to cell signal strength information of multiple outdoor grids on the first floor and horizontal position information of the multiple outdoor grids on the first floor; and determining that cell signal strength information in the test data from which the error data is deleted is the cell signal strength information of the outdoor grid that is on the first floor and corresponding to the indoor grid on the first floor.

Optionally, after the processor 810 deletes the error data from the test data according to the variation rule that cell signal strength is attenuated with a distance, the processor 810 may be further configured to:

perform, according to cell signal strength information of multiple outdoor grids that are on the first floor and whose distance from the outdoor grid that is on the first floor and corresponding to the indoor grid on the first floor is less than a second threshold, smooth processing on the cell signal strength information in the test data from which the error data is deleted; and the processor 810 determines that the cell signal strength information in the test data from which the error data is deleted is the cell signal strength information of the outdoor grid that is on the first floor and corresponding to the indoor grid on the first floor, which may include:

determining that the smooth-processed cell signal strength information in the test data from which the error data is deleted is the cell signal strength information of the outdoor grid that is on the first floor and corresponding to the indoor grid on the first floor.

Optionally, as another embodiment, the processor 810 is further configured to determine the cell signal strength information of the indoor grid, and is specifically configured to perform the following steps:

determining, according to horizontal position information of an indoor grid on a $p^{th}$ floor, an indoor grid that is on an $m^{th}$ floor and corresponding to the indoor grid on the $p^{th}$ floor or an outdoor grid that is on an $m^{th}$ floor and corresponding to the indoor grid on the $p^{th}$ floor;

acquiring cell signal strength information of the indoor grid that is on the $m^{th}$ floor and corresponding to the indoor grid on the $p^{th}$ floor or cell signal strength information of the outdoor grid that is on the $m^{th}$ floor and corresponding to the indoor grid on the $p^{th}$ floor; and determining cell signal strength information of the indoor grid on the $p^{th}$ floor according to the cell signal strength information of the indoor grid that is on the $m^{th}$ floor and corresponding to the indoor grid on the $p^{th}$ floor or the cell signal strength information of the outdoor grid that is on the $m^{th}$ floor and corresponding to the indoor grid on the $p^{th}$ floor, where p is an integer greater than 1, m is a positive integer less than p, a height of the first floor is a ground level, and a height of the $p^{th}$ floor is higher than the ground level.

Optionally, when the indoor grid on the $p^{th}$ floor is an indoor edge grid on the $p^{th}$ floor, the processor 810 determines, according to the horizontal position information of the indoor grid on the $p^{th}$ floor, an indoor grid that is on the first floor and corresponding to the indoor grid on the $p^{th}$ floor or an outdoor grid that is on the first floor and corresponding to the indoor grid on the $p^{th}$ floor, which may include:

determining an indoor edge grid that is on the first floor and corresponding to the indoor edge grid on the $p^{th}$ floor, where horizontal position information of the indoor edge grid that is on the first floor and corresponding to the indoor edge grid on the $p^{th}$ floor is consistent with the horizontal position information of the indoor grid on the $p^{th}$ floor; and the processor 810 determines cell signal strength information of the indoor grid on the first floor according to cell signal strength information of the indoor grid that is on the first floor and corresponding to the indoor grid on the $p^{th}$ floor or cell signal strength information of the outdoor grid that is on the first floor and corresponding to the indoor grid on the $p^{th}$ floor, which may include:

determining cell signal strength information of the indoor edge grid on the $p^{th}$ floor according to cell signal strength information of the indoor edge grid that is on the first floor and corresponding to the indoor edge grid on the $p^{th}$ floor and according to a loss relationship of signal strength between floors.

Optionally, when the indoor grid on the $p^{th}$ floor is an indoor non-edge grid on the $p^{th}$ floor, the processor 810 determines, according to the horizontal position information of the indoor grid on the $p^{th}$ floor, an indoor grid that is on the first floor and corresponding to the indoor grid on the $p^{th}$ floor or an outdoor grid that is on the first floor and corresponding to the indoor grid on the $p^{th}$ floor, which may include:

determining an indoor edge grid that is on the $p^{th}$ floor in any direction of the horizontal position information and corresponding to the indoor non-edge grid on the $p^{th}$ floor; and determining a first outdoor grid and a second outdoor grid, where both the first outdoor grid and the second outdoor grid are outdoor grids on the first floor, a relative position relationship between the first outdoor grid and the second outdoor grid is consistent with a relative position relationship between the indoor non-edge grid on the $p^{th}$ floor and the indoor edge grid that is on the $p^{th}$ floor and corresponding to the indoor non-edge grid on the $p^{th}$ floor, environmental relevance of the first outdoor grid is consistent with environmental relevance of the indoor edge grid that is on the $p^{th}$ floor and corresponding to the indoor non-edge grid on the $p^{th}$ floor, the relative position relationship between the first outdoor grid and the second outdoor grid is obtained through calculation according to horizontal position information of the first outdoor grid and horizontal position information of the second outdoor grid, and the relative position relationship between the indoor non-edge grid on the $p^{th}$ floor and the indoor edge grid that is on the $p^{th}$ floor and corresponding to the indoor non-edge grid on the $p^{th}$ floor is obtained through calculation according to horizontal position information of the indoor non-edge grid on the $p^{th}$ floor and horizontal position information of the indoor edge grid that is on the $p^{th}$ floor and corresponding to the indoor non-edge grid on the $p^{th}$ floor; and the processor 810 determines the cell signal strength information of the indoor grid on the $p^{th}$ floor according to cell signal strength information of the indoor grid that is on the first floor and corresponding to the indoor grid on the $p^{th}$ floor or cell signal strength information of the outdoor grid that is on the first floor and corresponding to the indoor grid on the $p^{th}$ floor, which may include:

determining cell signal strength information of the indoor non-edge grid on the $p^{th}$ floor according to cell signal strength information of the first outdoor grid, cell signal strength information of the second outdoor grid, and cell signal strength information of the indoor edge grid that is on the $p^{th}$ floor and corresponding to the indoor non-edge grid on the $p^{th}$ floor.

Optionally, the environmental relevance of the first outdoor grid includes a relative position relationship between the first outdoor grid and an antenna of a base station, and the environmental relevance of the indoor edge grid that is on the $p^{th}$ floor and corresponding to the indoor non-edge grid on the $p^{th}$ floor includes a relative position relationship between the antenna of the base station and the indoor edge grid that is on the $p^{th}$ floor and corresponding to the indoor non-edge grid on the $p^{th}$ floor.

Optionally, the relative position relationship between the first outdoor grid and the antenna of the base station is obtained through calculation according to the horizontal position information and height information of the first outdoor grid and horizontal position information and height information of the antenna of the base station; and the relative position relationship between the antenna of the base station and the indoor edge grid that is on the $p^{th}$ floor and corresponding to the indoor non-edge grid on the $p^{th}$ floor is obtained through calculation according to the horizontal position information and the height information of the antenna of the base station and the horizontal position information and height information of the indoor edge grid that is on the $p^{th}$ floor and corresponding to the indoor non-edge grid on the $p^{th}$ floor.

Optionally, as still another embodiment, the processor 810 is further configured to determine cell signal strength information of a non-edge grid in the indoor grid. Specific steps include:

determining, according to horizontal position information of an indoor non-edge grid on a $k^{th}$ floor, an indoor edge grid that is on the $k^{th}$ floor and whose distance from the indoor non-edge grid on the $k^{th}$ floor is less than a third threshold, where the distance is obtained through calculation according to horizontal position information of the grids, and k is an integer greater than or equal to 1;

acquiring cell signal strength information of the indoor edge grid that is on the $k^{th}$ floor and whose distance from the indoor non-edge grid on the $k^{th}$ floor is less than the third threshold;

determining, through emulation calculation and according to engineering parameter information of an antenna of a base station, emulated cell signal strength information of the indoor edge grid that is on the $k^{th}$ floor and whose distance from the indoor non-edge grid on the $k^{th}$ floor is less than the third threshold and emulated cell signal strength information of the indoor non-edge grid on the $k^{th}$ floor; and determining cell signal strength information of the indoor non-edge grid on the $k^{th}$ floor according to the emulated cell signal strength information of the indoor edge grid that is on the $k^{th}$ floor and whose distance from the indoor non-edge grid on the $k^{th}$ floor is less than the third threshold, the emulated cell signal strength information of the indoor non-edge grid on the $k^{th}$ floor, and the cell signal strength information of the indoor edge grid that is on the $k^{th}$ floor and whose distance from the indoor non-edge grid on the $k^{th}$ floor is less than the third threshold.

It should be understood that in this embodiment of the present invention, the indoor positioning apparatus 800 according to this embodiment of the present invention may be corresponding to an executor of a method according to the embodiment of the present invention, and may be further corresponding to the indoor positioning apparatus 700; and the foregoing and other operations and/or functions of the modules in the apparatus 800 are used to implement corresponding procedures of the methods in FIG. 1 to FIG. 15. For brevity, details are not described herein again.

Therefore, according to the indoor positioning apparatus provided in this embodiment of the present invention, current cell signal strength information of a to-be-positioned terminal located indoors is matched with cell signal strength information in three-dimensional (3D) indoor positioning matching information to determine horizontal position information and height information of a corresponding indoor grid, so as to determine a horizontal position at which the terminal is located indoors and a height at which the terminal is located. In this way, high-accuracy 3D indoor positioning can be implemented.

The indoor positioning apparatus provided in this embodiment of the present invention may be deployed, in the form of a functional module, in a base station, or may be a standalone positioning server, which is not limited in this embodiment of the present invention.

Figure 20:
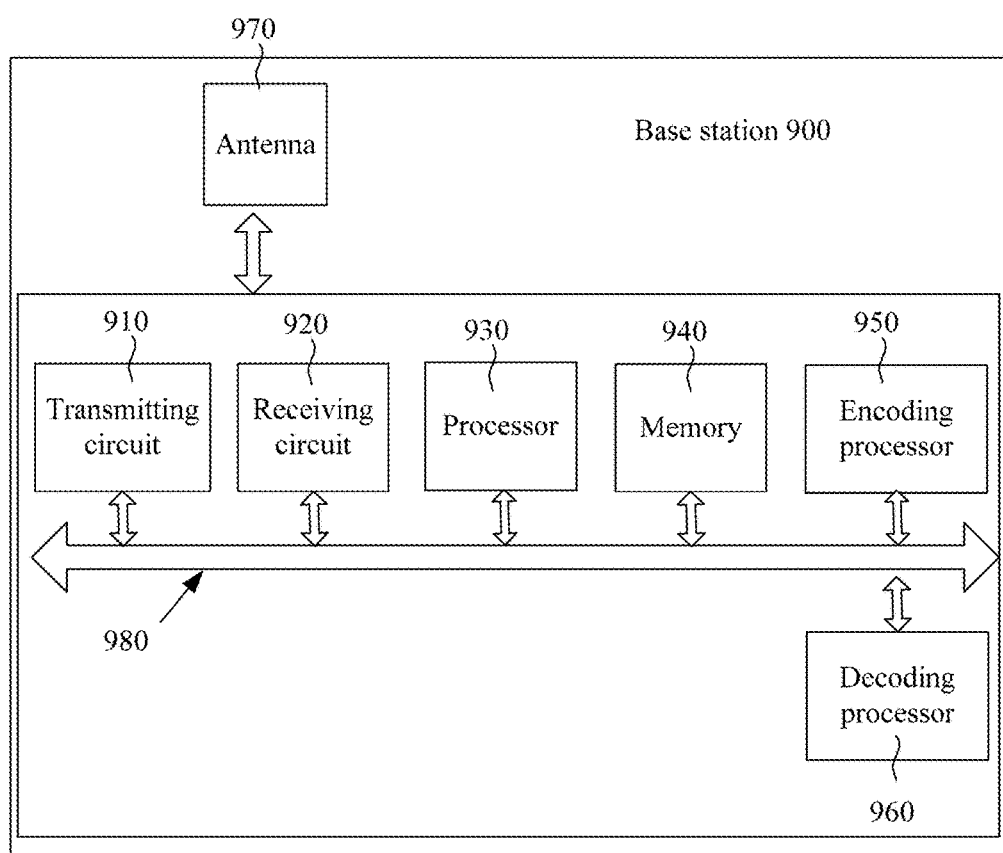
FIG. 20 is a schematic block diagram of a base station according to an embodiment of the present invention.

FIG. 20 is a schematic structural diagram of a base station having an indoor positioning function according to an embodiment of the present invention. As shown in FIG. 20, FIG. 20 shows a specific embodiment of a base station. In this embodiment, a base station 900 includes a transmitting circuit 910, a receiving circuit 920, a processor 930, a memory 940, an encoding processor 950, a decoding processor 960, an antenna 970, and a bus system 980. The processor 930 controls an operation of the base station 900 and may include one or more modules for positioning. The memory 940 may include a read-only memory and a random access memory, and provides an instruction and data for the processor 930. The memory 940 may further include a nonvolatile random access memory (NVRAM). Specifically, in this embodiment of the present invention, the memory 940 may be configured to store indoor positioning matching information.

In a specific application, the base station 900 may include a carrier that accommodates the transmitting circuit 910 and the receiving circuit 920, so as to allow data transmission and reception between the base station 900 and a remote position. The transmitting circuit 910 and the receiving circuit 920 may be coupled to the antenna 970. All components of the base station 900 are coupled together by using the bus system 980. In addition to a data bus, the bus system 980 further includes a power bus, a control bus, and a status signal bus. However, for clarity of description, various buses are marked as the bus system 980 in the figure. The base station 900 may further include the encoding processor 950 and the decoding processor 960 that are configured to perform encoding or decoding on a transmitted or received signal.

The foregoing methods disclosed in the embodiments of the present invention may be applied to the processor 930, or implemented by the processor 930. The foregoing indoor positioning apparatuses in the embodiments of the present invention may be specifically implemented by using the foregoing base station shown in FIG. 20. The processor 930 may be an integrated circuit chip, and has an instruction and data executing capability and a signal processing capability. In an implementation process, the steps in the foregoing methods may be completed by means of an integrated logic circuit of hardware in the processor 930 or an instruction in the form of software. The foregoing processor may be a general-purpose processor (CPU), a digital signal processor (DSP), an application-specific integrated circuit (ASIC), a field programmable gate array (FPGA), or another programmable logic device, a discrete gate or transistor logic device, or a discrete hardware component. The methods, the steps, and the logical block diagrams disclosed in the embodiments of the present invention may be implemented or executed. The general-purpose processor may be a microprocessor or the processor may be any conventional processor, or the like. The steps of the methods disclosed with reference to the embodiments of the present invention may be directly executed and accomplished by means of a hardware processor, or may be executed and accomplished by using a combination of hardware and software modules in a processor. The software module may be located in a mature storage medium in the field, such as a random access memory, a flash memory, a read-only memory, a programmable read-only memory, an electrically-erasable programmable memory, or a register. The storage medium is located in the memory 940, and the processor reads information from the memory 940 and completes the steps of the foregoing methods in combination with the hardware of the processor.

It should be understood that only one or three base stations are shown exemplarily in a schematic diagram of each embodiment of the present invention. For a building, there may be one or more base stations covering the building; and even, there may be a building that a base station cannot cover, which is not limited in the embodiments of the present invention.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for ease and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the purposes of the solutions of the embodiments of the present invention.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An indoor positioning method for high-accuracy three-dimensional (3D) indoor positioning, the method comprising:
    acquiring cell signal strength information of a terminal which is located indoors in a multi-floor building,
    determining, according to 3D indoor positioning matching information, horizontal position information and height information of a first indoor grid on a first floor that corresponds to the cell signal strength information, wherein the 3D indoor positioning matching information comprises a correspondence between cell signal strength information of the first indoor grid and the horizontal position information and the height information of the first indoor grid; and
    determining, according to the horizontal position information and the height information of the first indoor grid, a horizontal position and a height at which the terminal is located indoors, wherein the horizontal position information comprises position information in a first direction and a second direction, and the first direction and the second direction are two mutually perpendicular directions in a horizontal plane;

wherein the cell signal strength information of the first indoor grid is determined by,
  a) acquiring cell signal strength information of either a second indoor grid on a second floor or an outdoor grid on the second floor; and
  b) determining cell signal strength information of the first indoor grid according to the cell signal strength information of the second indoor grid or the outdoor grid, wherein a height of the first floor is greater than or equal to (a) ground level of the multi-floor building and (b) a height of the second floor.

2. The method according to claim 1,
wherein the second indoor grid is an indoor edge grid on the second floor, wherein horizontal position information of the indoor edge grid on the second floor is consistent with the horizontal position information of the first indoor grid on the first floor; and
wherein determining the cell signal strength information of the first indoor grid on the first floor comprises:
determining cell signal strength information of the indoor edge grid on the first floor according to cell signal strength information of the second indoor edge grid on the second floor according to a loss relationship of signal strength between floors.

3. The method according to claim 1, wherein the first indoor grid on the first floor is an indoor non-edge grid on the first floor, and
wherein the second indoor grid is an indoor edge grid that is on the first floor in any direction of the horizontal position information and corresponding to the indoor non-edge grid on the first floor; and
determining (a) a first outdoor grid and a second outdoor grid that are both outdoor grids on the second floor, (b) a relative position relationship between the first outdoor grid and the second outdoor grid is consistent with a relative position relationship between the indoor non-edge grid on the first floor and the indoor edge grid that is on the first floor and corresponding to the indoor non-edge grid on the first floor, (c) environmental relevance of the first outdoor grid is consistent with environmental relevance of the indoor edge grid that is on the first floor and corresponding to the indoor non-edge grid on the first floor, (d) the relative position relationship between the first outdoor grid and the second outdoor grid is obtained based on horizontal position information of the first outdoor grid and horizontal position information of the second outdoor grid, and (e) the relative position relationship between the indoor non-edge grid on the first floor and the indoor edge grid that is on the first floor and corresponding to the indoor non-edge grid on the first floor is obtained based on horizontal position information of the indoor non-edge grid on the first floor and horizontal position information of the indoor edge grid that is on the first floor and corresponding to the indoor non-edge grid on the first floor; and
wherein determining the cell signal strength information of the first indoor grid includes determining cell signal strength information of the indoor non-edge grid on the first floor according to cell signal strength information of the first outdoor grid, cell signal strength information of the second outdoor grid, and cell signal strength information of the indoor edge grid on the first floor.

4. The method according to claim 3, wherein the environmental relevance of the first outdoor grid comprises a relative position relationship between the first outdoor grid and an antenna of a base station; and
the environmental relevance of the indoor edge grid on the first floor comprises a relative position relationship between the antenna of the base station and the indoor edge grid on the first floor.

5. The method according to claim 4, wherein the relative position relationship between the first outdoor grid and the antenna of the base station is obtained based on the horizontal position information and height information of the first outdoor grid and horizontal position information and height information of the antenna of the base station; and
the relative position relationship between the antenna of the base station and the indoor edge grid that is on the first floor is obtained through calculation according to the horizontal position information and the height information of the antenna of the base station and the horizontal position information and height information of the indoor edge grid on the first floor.

6. The method according to claim 1, wherein cell signal strength information of a non-edge grid in the first indoor grid is determined according to the following:
determining, according to horizontal position information of an indoor non-edge grid on a third floor, an indoor edge grid on the third floor and whose distance from the indoor non-edge grid on the third floor is less than a threshold, wherein the distance is obtained based on horizontal position information of the grids;
acquiring cell signal strength information of the indoor edge grid on the third floor;
determining, through emulation calculation and according to engineering parameter information of an antenna of a base station, emulated cell signal strength information of the indoor edge grid on the third floor and emulated cell signal strength information of the indoor non-edge grid on the third floor; and
determining cell signal strength information of the indoor non-edge grid on the third floor according to (a) the emulated cell signal strength information of the indoor edge grid on the third floor, (b) the emulated cell signal strength information of the indoor non-edge grid on the third floor, and (c) the cell signal strength information of the indoor edge grid on the third floor.

7. An indoor positioning apparatus for high-accuracy three-dimensional (3D) indoor positioning, wherein the apparatus comprises:
a memory configured to store an instruction;
a processor configured to execute the instruction stored in the memory;
a transceiver configured to acquire cell signal strength information of a terminal located indoors in a multi-floor building; and
a bus apparatus configured to connect the memory, the processor and the transceiver,
wherein the processor is configured to execute the instruction stored in the memory to execute the following:
determine, according to 3D indoor positioning matching information, horizontal position information and height information of a first indoor grid on a first floor that corresponds to the cell signal strength information, where the 3D indoor positioning matching information includes a correspondence between cell signal strength information of the first indoor grid and the horizontal position information and the height information of the first indoor grid; and determine, according to the horizontal position information and the height information of the first indoor grid, a horizontal position and a height at which the terminal is located indoors, where the horizontal position information includes position information in a first direction and a second direction, and the first direction and the second direction are two mutually perpendicular directions in a horizontal plane;

wherein the cell signal strength information of the first indoor grid is determined by, a) acquiring cell signal strength information of either a second indoor on a second floor or an outdoor grid on the second floor; and b) determining cell signal strength information of the first indoor grid according to the cell signal strength information of the second indoor grid or the outdoor grid, wherein a height of the first floor is greater than or equal to (a) ground level of the multi-floor building and (b) a height of the second floor.

8. The apparatus according to claim 7, wherein the first indoor grid on the first floor is an indoor edge grid on the first floor, and wherein the second indoor grid is an indoor edge grid on the second floor, wherein horizontal position information of the indoor edge grid on the second floor is consistent with the horizontal position information of the first indoor grid on the first floor; and the processor is configured to:

determining cell signal strength information of the indoor edge grid on the first floor according to cell signal strength information of the indoor edge grid on the second floor and according to a loss relationship of signal strength between floors.

9. The apparatus according to claim 7, wherein the first indoor grid on the first floor is an indoor non-edge grid on the first floor, and the second indoor grid is an indoor edge grid that is on the first floor in any direction of the horizontal position information and corresponding to the indoor non-edge grid on the first floor; and the processor is configured to:

determine (a) a first outdoor grid and a second outdoor grid that are both outdoor grids on the second floor, (b) a relative position relationship between the first outdoor grid and the second outdoor grid is consistent with a relative position relationship between the indoor non-edge grid on the first floor and the indoor edge grid that is on the first floor and corresponding to the indoor non-edge grid on the first floor, (c) environmental relevance of the first outdoor grid is consistent with environmental relevance of the indoor edge grid that is on the first floor and corresponding to the indoor non-edge grid on the first floor, (d) the relative position relationship between the first outdoor grid and the second outdoor grid is obtained based on horizontal position information of the first outdoor grid and horizontal position information of the second outdoor grid, and (e) the relative position relationship between the indoor non-edge grid on the first floor and the indoor edge grid that is on the first floor and corresponding to the indoor non-edge grid on the first floor is obtained based on horizontal position information of the indoor non-edge grid on the first floor and horizontal position information of the indoor edge grid that is on the first floor and corresponding to the indoor non-edge grid on the first floor; and determine cell signal strength information of the indoor non-edge grid on the first floor according to cell signal strength information of the first outdoor grid, cell signal strength information of the second outdoor grid, and cell signal strength information of the indoor edge grid on the first floor.

10. The apparatus according to claim 9, wherein the environmental relevance of the first outdoor grid comprises a relative position relationship between the first outdoor grid and an antenna of a base station; and the environmental relevance of the indoor edge grid that is on the first floor comprises a relative position relationship between the antenna of the base station and the indoor edge grid on the first floor.

11. The apparatus according to claim 10, wherein the relative position relationship between the first outdoor grid and the antenna of the base station is obtained based on the horizontal position information and height information of the first outdoor grid and horizontal position information and height information of the antenna of the base station; and the relative position relationship between the antenna of the base station and the indoor edge grid that is on the first floor is obtained through calculation according to the horizontal position information and the height information of the antenna of the base station and the horizontal position information and height information of the indoor edge grid that is on the first floor.

12. The apparatus according to claim 7, wherein the processor is configured to:

determine, according to horizontal position information of an indoor non-edge grid on a third floor, an indoor edge grid that is on the third floor and whose distance from the indoor non-edge grid on the third floor is less than a third threshold, wherein the distance is obtained based on horizontal position information of the grids;

acquire cell signal strength information of the indoor edge grid that is on the third floor;

determine, through emulation calculation and according to engineering parameter information of an antenna of a base station, emulated cell signal strength information of the indoor edge grid that is on the third floor and emulated cell signal strength information of the indoor non-edge grid on the third floor; and determine cell signal strength information of the indoor non-edge grid on the third floor according to the (a) emulated cell signal strength information of the indoor edge grid that is on the third floor, (b) the emulated cell signal strength information of the indoor non-edge grid on the third floor, and (c) the cell signal strength information of the indoor edge grid that is on the third floor.

13. A non-transitory computer-readable medium with instructions stored thereon for high-accuracy three-dimensional (3D) indoor positioning, that when executed by a processor, perform the following:

acquiring cell signal strength information of a terminal which is located indoors in a multi-floor building;

determining, according to 3D indoor positioning matching information, horizontal position information and height information of a first indoor grid on a first floor that corresponds to the cell signal strength information, wherein the 3D indoor positioning matching information comprises a correspondence between cell signal strength information of the first indoor grid and the horizontal position information and the height information of the first indoor grid; and determining, according to the horizontal position information and the height information of the first indoor grid, a horizontal position and a height at which the terminal is located indoors, wherein the horizontal position information comprises position information in a first direction and a second direction, and the first direction and the second direction are two mutually perpendicular directions in a horizontal plane, wherein the cell signal strength information of the first indoor grid is determined by,
    a) acquiring cell signal strength information of either a second indoor grid on a second floor or an outdoor grid on the second floor; and
    b) determining cell signal strength information of the first indoor grid according to the cell signal strength information of the second indoor grid or the outdoor grid, wherein a height of the first floor is greater than or equal to (a) ground level of the multi-floor building and (b) a height of the second floor.

14. The non-transitory computer-readable medium with instructions stored thereon according to claim 13, wherein the second indoor grid is an indoor edge grid on the second floor and horizontal position information of the indoor edge grid on the second floor is consistent with the horizontal position information of the first indoor grid on the first floor; and
    wherein determining the cell signal strength information of the first indoor grid on the first floor comprises determining cell signal strength information of the indoor edge grid on the first floor according to cell signal strength information of the second indoor edge grid on the second floor according to a loss relationship of signal strength between floors.

15. The non-transitory computer-readable medium with instructions stored thereon according to claim 13, that when executed by a processor, determine cell signal strength information of a non-edge grid in the first indoor grid according to the following:
    determining, according to horizontal position information of an indoor non-edge grid on a third floor, an indoor edge grid on the third floor and whose distance from the indoor non-edge grid on the third floor is less than a threshold, wherein the distance is obtained based on horizontal position information of the grids;
    acquiring cell signal strength information of the indoor edge grid on the third floor;
    determining, through emulation calculation and according to engineering parameter information of an antenna of a base station, emulated cell signal strength information of the indoor edge grid on the third floor and emulated cell signal strength information of the indoor non-edge grid on the third floor; and
    determining cell signal strength information of the indoor non-edge grid on the third floor according to (a) the emulated cell signal strength information of the indoor edge grid on the third floor, (b) the emulated cell signal strength information of the indoor non-edge grid on the third floor, and (c) the cell signal strength information of the indoor edge grid on the third floor.

\* \* \* \* \*